US009690078B2

(12) United States Patent
Tsai et al.

(10) Patent No.: US 9,690,078 B2
(45) Date of Patent: *Jun. 27, 2017

(54) OPTICAL IMAGE CAPTURING SYSTEM

(71) Applicant: LARGAN PRECISION CO., LTD., Taichung (TW)

(72) Inventors: Tsung-Han Tsai, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/226,909

(22) Filed: Aug. 2, 2016

(65) Prior Publication Data

US 2016/0341937 A1 Nov. 24, 2016

Related U.S. Application Data

(63) Continuation of application No. 14/934,112, filed on Nov. 5, 2015, now Pat. No. 9,435,986, which is a (Continued)

(30) Foreign Application Priority Data

Jul. 6, 2012 (TW) .............................. 101124430 A

(51) Int. Cl.
*G02B 13/00* (2006.01)
*G02B 13/18* (2006.01)
(Continued)

(52) U.S. Cl.
CPC .......... *G02B 13/0045* (2013.01); *G02B 3/04* (2013.01); *G02B 9/64* (2013.01); *G02B 13/18* (2013.01);
(Continued)

(58) Field of Classification Search
CPC .............................. G02B 9/64; G02B 13/0045
(Continued)

(56) References Cited

U.S. PATENT DOCUMENTS 5,042,929 A 8/1991 Tanaka et al.
5,200,861 A 4/1993 Moskovich
(Continued)

FOREIGN PATENT DOCUMENTS

CN 101408664 A 4/2009
JP 08-043737 A 2/1996
(Continued)

*Primary Examiner* — Scott J Sugarman
*Assistant Examiner* — Sharrief Broome
(74) *Attorney, Agent, or Firm* — CKC & Partners Co., Ltd.

(57) ABSTRACT

An optical image capturing system includes, in order from an object side to an image side, a first lens element, a second lens element, a third lens element, a fourth lens element, a fifth lens element, a sixth lens element and a seventh lens element. The first, the second and the third lens elements all have refractive power. The fourth lens element with refractive power has both surfaces being aspheric. The fifth lens element with refractive power has both surfaces being aspheric. The sixth lens element with refractive power has an image-side surface having at least one convex shape at a peripheral region thereof and both surfaces being aspheric. The seventh lens element with refractive power has an image-side surface having at least one convex shape at a peripheral region thereof, wherein both surfaces being aspheric, and at least one surface has at least one inflection point thereon.

32 Claims, 22 Drawing Sheets

Related U.S. Application Data continuation of application No. 14/523,950, filed on Oct. 27, 2014, now Pat. No. 9,213,168, which is a continuation of application No. 14/287,054, filed on May 25, 2014, now Pat. No. 8,902,511, which is a continuation of application No. 14/016,209, filed on Sep. 2, 2013, now Pat. No. 8,767,315, which is a continuation of application No. 13/669,445, filed on Nov. 6, 2012, now Pat. No. 8,599,495.

(51) Int. Cl.
  *G02B 3/04* (2006.01)
  *G02B 9/64* (2006.01)
  *H04N 5/225* (2006.01)
  *G02B 27/00* (2006.01)

(52) U.S. Cl.
  CPC ....... *G02B 27/0025* (2013.01); *H04N 5/2254* (2013.01)

(58) Field of Classification Search
  USPC .................................................. 359/700–708
  See application file for complete search history.

(56) References Cited

U.S. PATENT DOCUMENTS

| | | | |
|---|---|---|---|
| 5,587,840 A | 12/1996 | Itoh | |
| 5,844,725 A | 12/1998 | Itoh | |
| 7,864,454 B1* | 1/2011 | Tang | G02B 9/60 359/714 |
| 8,599,495 B1* | 12/2013 | Tsai | G02B 13/0045 359/708 |
| 8,767,315 B2* | 7/2014 | Tsai | G02B 13/0045 359/700 |
| 8,902,511 B2* | 12/2014 | Tsai | G02B 13/0045 359/708 |
| 9,213,168 B2* | 12/2015 | Tsai | G02B 13/0045 |
| 9,435,986 B2* | 9/2016 | Tsai | G02B 13/0045 |

FOREIGN PATENT DOCUMENTS

| | | |
|---|---|---|
| JP | 08-076015 A | 3/1996 |
| JP | 09-015499 A | 1/1997 |
| JP | 09-015500 A | 1/1997 |
| JP | 11-064730 A | 3/1999 |
| JP | 2005-156829 A | 6/2005 |

\* cited by examiner

OPTICAL IMAGE CAPTURING SYSTEM

RELATED APPLICATIONS

The present application is a continuation of the application Ser. No. 14/934,112, filed on Nov. 5, 2015, which is a continuation of the application Ser. No. 14/523,950, filed on Oct. 27, 2014, U.S. Pat. No. 9,213,168, which is a continuation of the application Ser. No. 14/287,054, filed on May 25, 2014, U.S. Pat. No. 8,902,511, which is a continuation of the application Ser. No. 14/016,209, filed on Sep. 2, 2013, U.S. Pat. No. 8,767,315, which is a continuation of the application Ser. No. 13/669,445, filed on Nov. 6, 2012, U.S. Pat. No. 8,599,495, which claims priority under 35 U.S.C. 119(e) to Taiwan application serial number 101124430, filed on Jul. 6, 2012, the entire contents of which are hereby incorporated herein by reference.

BACKGROUND

Technical Field

The present disclosure relates to an optical image capturing system. More particularly, the present invention relates to a miniaturized optical image capturing system applicable to electronic products.

Description of Related Art

In recent years, with the popularity of mobile products having camera functionalities, a demand for optical system has been increasing. A photosensitive sensor of a conventional optical system is typically a CCD (Charge-Coupled Device) or a CMOS (Complementary Metal-Oxide-Semiconductor) sensor. As the advanced semiconductor manufacturing technologies have allowed a pixel size of sensors to be reduced and the optical systems have gradually evolved toward a field of higher megapixels, there is an increasing demand for better image quality.

A conventional optical system employed in a portable electronic product, as shown in U.S. Pat. No. 7,869,142, mainly adopts a structure of four lens elements. Due to the popularity of mobile products with high-end specifications, such as smart phones and PDAs (Personal Digital Assistants), requirements of higher megapixels and better image quality have increased rapidly. However, the conventional optical systems cannot satisfy the requirements of high-end optical systems with camera functionalities.

A conventional optical image lens assembly with many lens elements is usually too bulky to have its size being miniaturized; therefore, it is not applicable to portable electronic products with a compact size. An optical image lens assembly with five lens elements, such as "Imaging Lens Assembly" disclosed in U.S. Pat. No. 8,000,030, lacks good ability to correct high order aberrations and off-axis aberrations. Moreover, the space arrangement, the distribution of refractive power and the design of lens surface are not favorable to have its total track of length being effectively shortened thereof and it is thereby not easy to have a compact size with good image quality.

SUMMARY

In one aspect of the present disclosure, an optical image capturing system in order from an object side to an image side, includes a first lens element, a second lens element, a third lens element, a fourth lens element, a fifth lens element, a sixth lens element and a seventh lens element. The first lens element has refractive power. The second lens element has refractive power. The third lens element has refractive power. The fourth lens element with refractive power has an object-side surface and an image-side surface being both aspheric. The fifth lens element with refractive power has an object-side surface and an image-side surface being both aspheric. The sixth lens element with refractive power has an image-side surface having at least one convex shape at a peripheral region thereof, wherein an object-side surface and the image-side surface of the sixth lens element are both aspheric. The seventh lens element with refractive power has an image-side surface having at least one convex shape at a peripheral region thereof, wherein an object-side surface and the image-side surface of the seventh lens element are both aspheric, and at least one of the object-side surface and the image-side surface of the seventh lens element has at least one inflection point thereon. The optical image capturing system has a total of seven lens elements with refractive power, and further comprises a stop located closer to the object side than the second lens element, each of the first lens element, the second lens element, the third lens element, the fourth lens element, the fifth lens element, the sixth lens element and the seventh lens element is a single and non-cemented lens element.

In another aspect of the present disclosure, an image capturing device includes the optical image capturing system according to the aforementioned aspect, and an image sensor located on the image side of the optical image capturing system.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
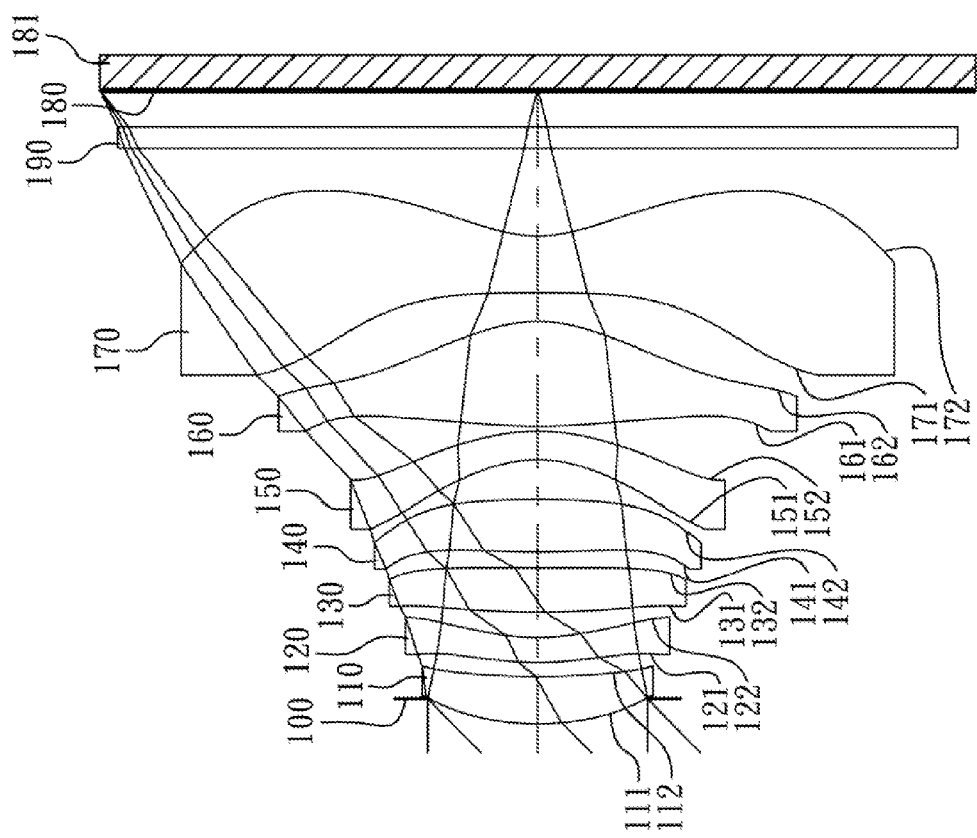
FIG. 1 is a schematic view of an optical image capturing system according to the 1st embodiment of the present disclosure.

An optical image capturing system in order from an object side to an image side, includes a first lens element, a second lens element, a third lens element, a fourth lens element, a fifth lens element, a sixth lens element and a seventh lens element. The optical image capturing system further includes an image sensor disposed on an image plane of the optical image capturing system.

Each of the first lens element, the second lens element, the third lens element, the fourth lens element, the fifth lens element, the sixth lens element and the seventh lens element is a single and non-cemented lens element. That is, any two lens elements adjacent to each other are not cemented (such as the image-side surface of the first lens element and an object-side surface of the second lens element), and there is an air space between the two lens elements. That is, an air distance between two adjacent surfaces of any two adjacent lens elements. Since the manufacturing process of the cemented lenses is more complex than the non-cemented lenses. In particular, a second surface of one lens and a first surface of the following lens need to have accurate curvature to ensure these two lens elements will be highly cemented. However, during the cementing process, those two lens elements might not be highly cemented due to displacement and it is thereby not favorable for the image quality of the optical image capturing system. Therefore, the optical image capturing system of the present disclosure provides seven single and non-cemented lens elements for improving upon the problem generated by the cemented lens elements.

The first lens element with positive refractive power has a convex object-side surface and a concave image-side surface, so that a total track length of the optical image capturing system can be reduced by adjusting the positive refractive power of the first lens element.

The second lens element has a convex object-side surface and a concave image-side surface so that an astigmatic of the optical image capturing system can be corrected.

At least one of an object-side surface and an image-side surface of fourth lens element can include at least one inflection point, respectively.

The fifth lens element with negative refractive power can correct an aberration of the optical image capturing system so as to improve image quality. The fifth lens element can have a concave object-side surface and a convex image-side surface, so that the fifth lens element can effectively correct the astigmatism of the optical image capturing system.

The sixth lens element with positive refractive power has an object-side surface and an image-side surface which are both convex, so that an high order aberration of the optical image capturing system can be corrected so as to enhance a resolving power of the optical image capturing system for better image quality. Furthermore, the object-side surface of the sixth lens element changes from convex at a paraxial region to concave at a peripheral region so as to maintain a relative illumination of the periphery of images.

The seventh lens element with negative refractive power has an object-side surface and an image-side surface which are both concave, so that a principal point of the optical image capturing system can be positioned away from the image plane for reducing a back focal length thereof so as to further reduce the total track length of the optical image capturing system and maintain a compact size thereof. Moreover, the image-side surface of the seventh lens element changes from concave at a paraxial region to convex at a peripheral region, and the seventh lens element has at least one inflection point formed on the image-side surface thereof. Therefore, an incident angle of an off-axis field onto the image sensor can be effectively minimized, and preferably, aberrations of the off-axis field can be corrected.

When a curvature radius of the object-side surface of the seventh lens element is R13, and a curvature radius of the image-side surface of the seventh lens element is R14, the following relationship is satisfied:

$$-5.0 < R14/R13 < 1.0.$$

By such an arrangement, the configuration of the surface curvature of the seventh lens element is favorable for the disposition of the other lens elements, the arrangement of the aspheric surface of the other lens elements and the arrangement of the inflection point to correct the high order aberration and the off-axis aberrations, for example, the comatic aberration and the astigmatism, and to reduce the angle at which the incident light projects onto the image sensor from the off-axis field under a certain total track length and to realize an optical image capturing system with a better image quality and a compact size.

Preferably, the optical image capturing system further satisfies the following relationship:

$$-2.0<R14/R13<0.5.$$

When a focal length of the optical image capturing system is f, a focal length of the sixth lens element is f6, and a focal length of the seventh lens element is f7, the following relationship is satisfied:

$$1.8<|f/f6|+|f/f7|<6.0.$$

By properly arranging the focal lengths of the sixth lens element and the seven lens element so as to form a positive-negative telephoto structure, the total track length of the optical image capturing system can be effectively reduced. Preferably, the optical image capturing system further satisfies the following relationship:

$$2.3<|f/f6|+|f/f7|<5.0.$$

When a distance in parallel with an optical axis from a maximum effective diameter position on the image-side surface of the fifth lens element to an axial vertex on the image-side surface of the fifth lens element is SAG52, and a central thickness of the fifth lens element is CT5, the following relationship is satisfied:

$$-0.7 \text{ mm}<SAG52+CT5<-0.1 \text{ mm}.$$

Accordingly, it is favorable for manufacturing and assembling the lens elements by arranging a proper surface curvature of the image-side surface of the fifth lens element and a proper thickness of the fifth lens element.

When an Abbe number of the first lens element is V1, and an Abbe number of the second lens element is V2, the following relationship is satisfied:

$$28<V1-V2<42.$$

Accordingly, a chromatic aberration of the optical image capturing system can be corrected.

When the focal length of the optical image capturing system is f, and an axial distance from the object-side surface of the first lens element to the image-side surface of the seventh lens element is Td, the following relationship is satisfied:

$$0.50<Td/f<1.35.$$

Therefore, the total track length of the optical image capturing system can be effectively reduced so as to keep the optical image capturing system compact.

Preferably, the optical image capturing system further satisfies the following relationship:

$$0.80<Td/f<1.25.$$

When the focal length of the optical image capturing system is f, a focal length of the third lens element is f3, and a focal length of the fourth lens element is f4, the following relationship is satisfied:

$$|f/f3|+|f/f4|<1.0.$$

Therefore, the focal lengths of the third lens element and the fourth lens element are favorable for reducing the sensitivity of the optical image capturing system.

When the focal length of the optical image capturing system is f, and the focal length of the seventh lens element is f7, the following relationship is satisfied:

$$-3.0<f/f7<-1.3.$$

Consequently, the refractive power of the seventh lens element will be favorable for further reducing the back focal length of the optical image capturing system so as to reduce the total track length of the optical image capturing system.

When a minimum central thickness of a lens element among all lens elements of the optical image capturing system is CTmin, the following relationship is satisfied:

$$0.10 \text{ mm}<CT\text{min}<0.30 \text{ mm}.$$

Therefore, by adjusting the thickness of the lens elements, it is favorable for manufacturing the lens elements, and preventing the over-thin lens elements from being formed abnormally so as to increase the yield rate of the lens elements.

When the focal length of the optical image capturing system is f, and a vertical distance from a critical point on the image-side surface of the seventh lens element to an axial vertex on the image-side surface of the seventh lens element is Yc72, the following relationship is satisfied:

$$0.1<Yc72/f<0.9.$$

Accordingly, the angle at which the incident light projects onto the image sensor from the off-axis field can be effectively reduced to improve the image quality.

When a maximal field of view of the optical image capturing system is FOV, the following relationship is satisfied:

$$72 \text{ degrees}<FOV<95 \text{ degrees}.$$

Accordingly, a larger field of view can be provided so as to obtain the required image scope and to avoid the image from distortion.

When the curvature radius of the image-side surface of the seventh lens element is R14, and the focal length of the optical image capturing system is f, and the following relationship is satisfied:

$$0.1<R14/f<1.0.$$

Therefore, the curvature radius of the image-side surface of the seventh lens element will be favorable for the principal point of the optical image capturing system being positioned away from the image plane so that the back focal length thereof can be reduced and the compact size thereof can be maintained.

When a maximum image height of the optical image capturing system is ImgH, and an axial distance between the object-side surface of the first lens element and the image plane is TTL, the following relationship is satisfied:

$$1.00<TTL/ImgH<1.70.$$

Thus, the total track length of the optical image capturing system can be reduced so as to maintain the compact size thereof, and suitable for applying to the compact portable electronic products.

In the optical image capturing system of the disclosure, the lens elements can be made of plastic or glass material. When the lens elements are made of glass material, the distribution of the refractive power of the optical image capturing system can be more flexible to design. When the lens elements are made of plastic material, the manufacturing cost thereof can be decreased.

Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Thus, the total track length of the optical image capturing system can be effectively reduced.

In the optical image capturing system of the disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the paraxial region of the surface is convex; and when the lens element has a concave surface, it indicates that the paraxial region of the surface is concave.

According to the optical image capturing system of the present disclosure, a critical point is a non-axial point of the lens surface where its tangent is perpendicular to the optical axis.

In the optical image capturing system of the disclosure, the optical image capturing system can include at least one stop, such as an aperture stop, a glare stop or a field stop. Said glare stop or said field stop is for eliminating the stray light and thereby improving the image resolution thereof.

In the present optical image capturing system, an aperture stop can be configured as a front stop or a middle stop. A front stop disposed between an object and a first lens element can provide a longer distance between an exit pupil of the system and an image plane and which improves the image-sensing efficiency of an image sensor. A middle stop disposed between the first lens element and an image plane is favorable for enlarging the field of view of the system and thereby provides a wider field of view for the same.

The optical image capturing system do not only equip with superior aberration correction functionality but also equip with superior image quality that can be applied to many electronic image systems, such as three-dimensional image capturing systems, digital cameras, portable devices or digital tablets.

According to the above description of the present disclosure, the following 1st-10th specific embodiments are provided for further explanation.

1st Embodiment

Figure 2:
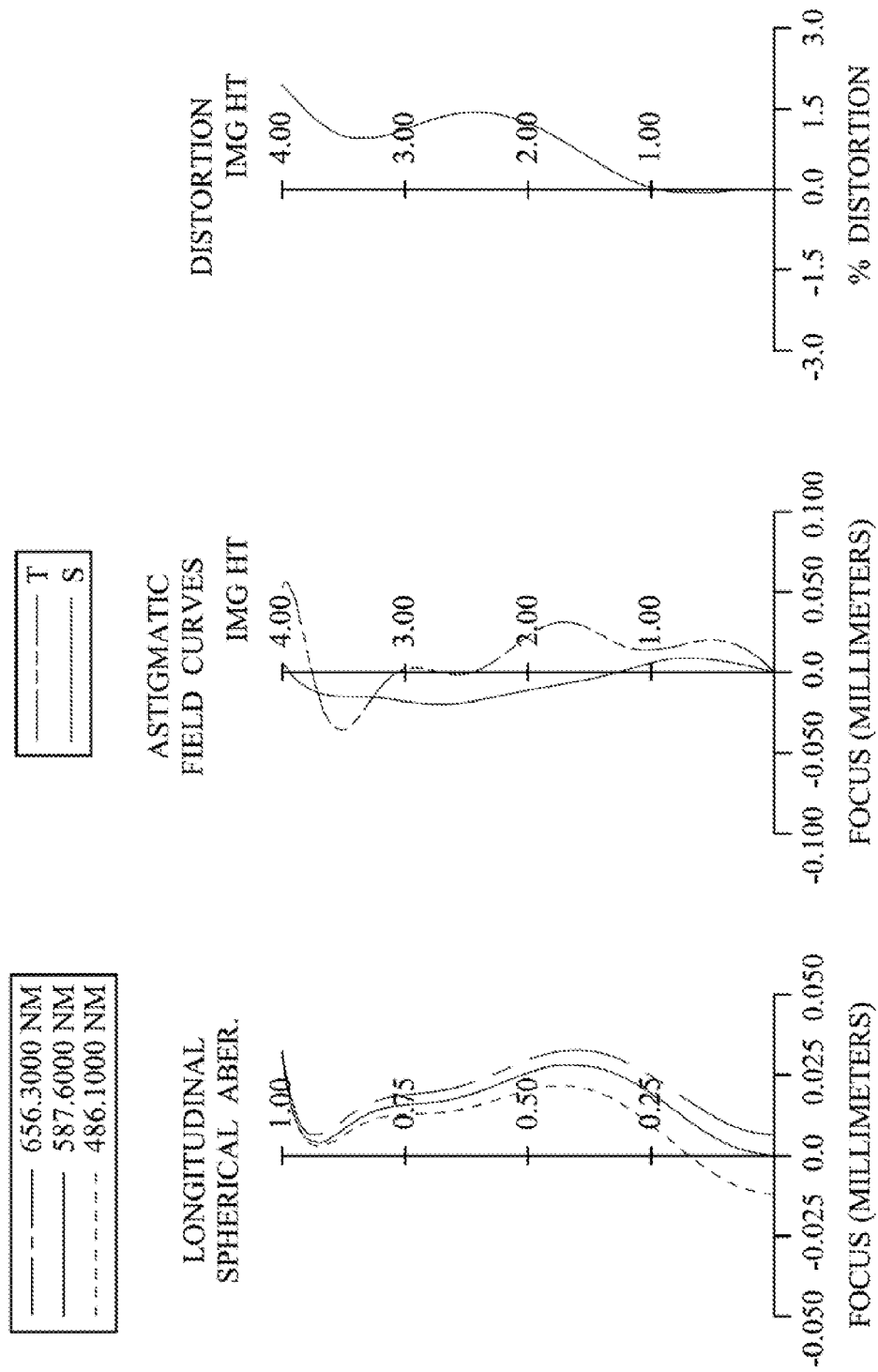
FIG. 2 shows, in order from left to right, spherical aberration curves, astigmatic field curves and a distortion curve of the optical image capturing system according to the 1st embodiment.

FIG. 1 is a schematic view of an optical image capturing system according to the 1st embodiment of the present disclosure. FIG. 2 shows, in order from left to right, spherical aberration curves, astigmatic field curves and a distortion curve of the optical image capturing system according to the 1st embodiment.

In FIG. 1, the optical image capturing system includes, in order from an object side to an image side, an aperture stop 100, a first lens element 110, a second lens element 120, a third lens element 130, a fourth lens element 140, a fifth lens element 150, a sixth lens element 160, a seventh lens element 170, an IR-cut filter 190, an image plane 180 and an image sensor 181.

The first lens element 110 with positive refractive power has a convex object-side surface 111 and a concave image-side surface 112, which are both aspheric, and the first lens element 110 is made of plastic material.

The second lens element 120 with negative refractive power has a convex object-side surface 121 and a concave image-side surface 122, which are both aspheric, and the second lens element 120 is made of plastic material.

The third lens element 130 with positive refractive power has a convex object-side surface 131 and a concave image-side surface 132, which are both aspheric, and the third lens element 130 is made of plastic material.

The fourth lens element 140 with positive refractive power has a convex object-side surface 141 and a convex image-side surface 142, which are both aspheric, and the fourth lens element 140 is made of plastic material. Furthermore, the object-side surface 141 of the fourth lens element 140 includes at least one inflection point.

The fifth lens element 150 with negative refractive power has a concave object-side surface 151 and a convex image-side surface 152, which are both aspheric, and the fifth lens element 150 is made of plastic material.

The sixth lens element 160 with positive refractive power has a convex object-side surface 161 and a convex image-side surface 162 which are both aspheric, and the sixth lens element 160 is made of plastic material. The object-side surface 161 changes from convex at a paraxial region to concave at a peripheral region.

The seventh lens element 170 with negative refractive power has a concave object-side surface 171 and a concave image-side surface 172 which are both aspheric, and the seventh lens element 170 is made of plastic material. The image-side surface 172 changes from concave at a paraxial region to convex at a peripheral region. Furthermore, the image-side surface 172 of the seventh lens element 170 includes at least one inflection point.

The IR-cut filter 190 is made of glass and located between the seventh lens element 170 and the image plane 180, and will not affect the focal length of the optical image capturing system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where:

X is the relative distance between a point on the aspheric surface spaced at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the optical image capturing system according to the 1st embodiment, when a focal length of the optical image capturing system is f, an f-number of the optical image capturing system is Fno, and a half of the maximal field of view of the optical image capturing system is HFOV, these parameters have the following values:

$f$=4.01 mm;

$Fno$=2.00; and $H$FOV=44.3 degrees.

In the optical image capturing system according to the 1st embodiment, when an Abbe number of the first lens element 110 is V1, and an Abbe number of the second lens element 120 is V2, the following relationship is satisfied:

$V1-V2$=32.6.

In the optical image capturing system according to the 1st embodiment, when a minimum central thickness of a lens element among all lens elements of the optical image capturing system is CTmin, the following relationship is satisfied:

$CTmin=0.230$ mm.

In the optical image capturing system according to the 1st embodiment, when a curvature radius of the object-side surface 171 of the seventh lens element 170 is R13, a curvature radius of the image-side surface 172 of the seventh lens element 170 is R14, and the focal length of the optical image capturing system is f, the following relationships are satisfied:

$R14/R13=-0.03$; and $R14/f=0.27$.

In the optical image capturing system according to the 1st embodiment, when the focal length of the optical image capturing system is f, a focal length of the third lens element 130 is f3, a focal length of the fourth lens element 140 is f4, a focal length of the sixth lens element 160 is f6, and a focal length of the seventh lens element 170 is f7, the following relationships are satisfied:

$|f/f3|+|f/f4|=0.67$;

$|f/f6|+|f/f7|=4.17$; and $f/f7=-2.07$.

Figure 21:
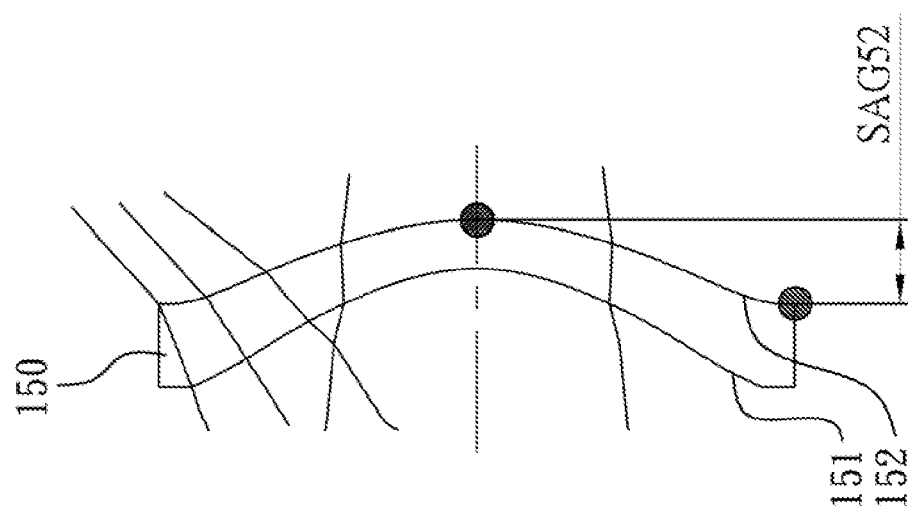
FIG. 21 is a schematic parameter of the fifth lens element of the optical image capturing system according to the 1st embodiment of FIG. 1.

Reference is now made to FIG. 21 which is a schematic parameter of the fifth lens element 150 of the optical image capturing system according to the 1st embodiment of FIG. 1.

In FIG. 21, when a distance in parallel with the optical axis from a maximum effective diameter position on the image-side surface 152 of the fifth lens element 150 to an axial vertex on the image-side surface 152 of the fifth lens element 150 is SAG52, and a central thickness of the fifth lens element 150 is CT5, the following relationship is satisfied:

$SAG52+CT5=-0.19$ mm.

Figure 22:
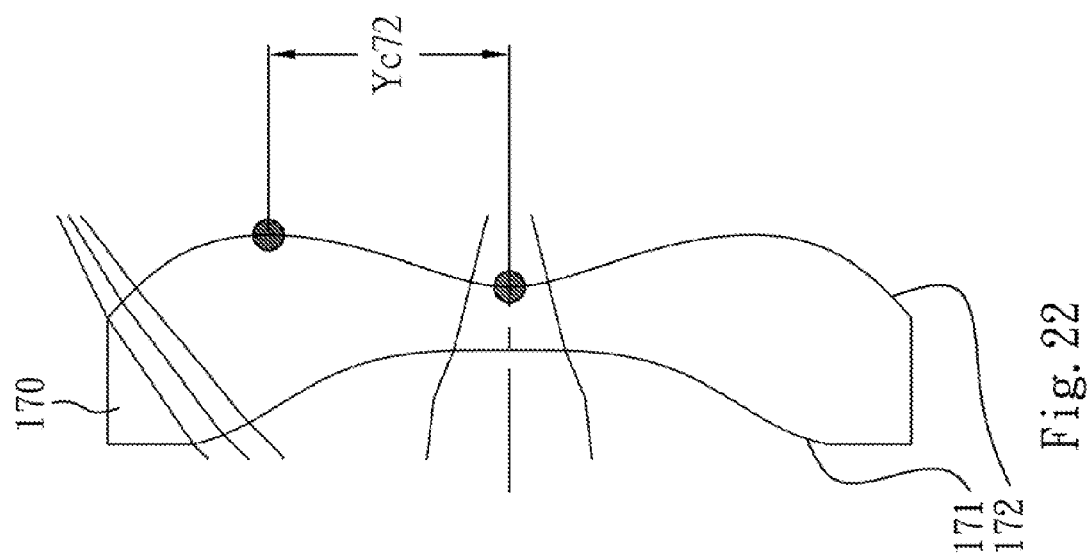
FIG. 22 is a schematic parameter of the seventh lens element of the optical image capturing system according to the 1st embodiment of FIG. 1.

Please refer to FIG. 22; FIG. 22 is a schematic parameter of the seventh lens element 170 of the optical image capturing system according to the 1st embodiment of FIG. 1.

In FIG. 22, a vertical distance from a critical point on the image-side surface 172 of the seventh lens element 170 to an axial vertex on the image-side surface 172 of the seventh lens element 170 is Yc72, the focal length of the optical image capturing system is f, and an axial distance from the object-side surface 111 of the first lens element 110 to the image-side surface 172 of the seventh lens element 170 is Td, the following relationships are satisfied:

$Yc72/f=0.49$; and $Td/f=1.11$.

In the optical image capturing system according to the 1st embodiment, when the maximal field of view of the optical image capturing system is FOV, the following relationship is satisfied:

$FOV=88.6$ degrees.

In the optical image capturing system according to the 1st embodiment, when a maximum image height of the optical image capturing system is ImgH which here is half of the diagonal length of the photosensitive area of the image sensor 181 on the image plane 180, and an axial distance between the object-side surface 111 of the first lens element 110 and an image plane 180 is TTL, the following relationship is satisfied:

$TTL/ImgH=1.43$.

Refer to Table 1 and Table 2 as follows. The detailed optical data of the 1st embodiment are shown in Table 1 and the aspheric surface data are shown in Table 2 below.

TABLE 1

1st Embodiment
f = 4.01 mm, Fno = 2.00, HFOV = 44.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.232 | | | | |
| 2 | Lens 1 | 2.434710 (ASP) | 0.432 | Plastic | 1.544 | 55.9 | 7.09 |
| 3 | | 6.184400 (ASP) | 0.129 | | | | |
| 4 | Lens 2 | 2.617130 (ASP) | 0.230 | Plastic | 1.640 | 23.3 | −18.39 |
| 5 | | 2.067550 (ASP) | 0.227 | | | | |
| 6 | Lens 3 | 8.427200 (ASP) | 0.408 | Plastic | 1.544 | 55.9 | 18.55 |
| 7 | | 50.097500 (ASP) | 0.148 | | | | |
| 8 | Lens 4 | 8.616300 (ASP) | 0.475 | Plastic | 1.544 | 55.9 | 8.83 |
| 9 | | −10.657500 (ASP) | 0.369 | | | | |
| 10 | Lens 5 | −1.135390 (ASP) | 0.260 | Plastic | 1.640 | 23.3 | −5.23 |
| 11 | | −1.871900 (ASP) | 0.046 | | | | |
| 12 | Lens 6 | 5.095500 (ASP) | 0.960 | Plastic | 1.544 | 55.9 | 1.92 |
| 13 | | −1.224510 (ASP) | 0.260 | | | | |
| 14 | Lens 7 | −39.871000 (ASP) | 0.519 | Plastic | 1.544 | 55.9 | −1.93 |
| 15 | | 1.086250 (ASP) | 0.800 | | | | |
| 16 | IR-cut filter | Plano | 0.200 | Glass | 1.517 | 64.2 | — |
| 17 | | Plano | 0.333 | | | | |
| 18 | Image | Plano | — | | | | |

Note:
Reference wavelength (d-line) is 587.6 nm.

TABLE 2

Aspheric Coefficients

| Surface # | 2 | 3 | 4 | 5 | 6 |
|---|---|---|---|---|---|
| k = | 8.27120E−01 | 4.62437E+00 | −1.13191E+01 | −6.38616E+00 | 0.00000E−00 |
| A4 = | −1.74532E−03 | −5.83063E−02 | −1.16345E−01 | −6.30254E−02 | −3.22408E−03 |
| A6 = | 1.66444E−02 | 9.03971E−02 | 1.17622E−01 | 5.70756E−02 | −2.88888E−03 |
| A8 = | 4.28968E−03 | −3.60302E−02 | −7.66726E−02 | −2.83491E−02 | 4.59177E−04 |
| A10 = | −3.07413E−02 | −1.36439E−02 | 7.44823E−03 | 6.65499E−03 | −2.13932E−03 |
| A12 = | 3.78197E−02 | 1.65731E−02 | 1.44225E−02 | −8.04619E−03 | |
| A14 = | −1.23654E−02 | −1.71803E−03 | −1.00255E−02 | 2.81404E−03 | |

| Surface # | 7 | 8 | 9 | 10 | 11 |
|---|---|---|---|---|---|
| k = | 0.00000E+00 | −1.41923E+01 | 3.00000E+00 | −1.91162E+00 | −2.91712E+00 |
| A4 = | −2.22211E−02 | −4.89368E−02 | −2.77627E−02 | 1.27682E−01 | 4.41976E−02 |
| A6 = | 1.62467E−03 | −9.79475E−03 | −2.68788E−02 | −1.56848E−01 | −4.96818E−02 |
| A8 = | −2.71793E−03 | 8.35766E−03 | 4.86057E−03 | 9.93741E−02 | 2.88045E−02 |
| A10 = | −1.57662E−03 | 3.63072E−03 | 7.65106E−05 | −4.10875E−02 | −1.07348E−02 |
| A12 = | | −2.59001E−03 | −1.00897E−04 | 1.33686E−02 | 2.93622E−03 |
| A14 = | | 1.02823E−03 | 1.39343E−04 | −2.16846E−03 | −3.46573E−04 |

| Surface # | 12 | 13 | 14 | 15 |
|---|---|---|---|---|
| k = | 1.52786E+00 | −5.57551E+00 | −1.12826E+01 | −6.42535E+00 |
| A4 = | −6.23424E−02 | −1.65595E−02 | −5.43119E−02 | −2.80654E−02 |
| A6 = | 2.96152E−02 | 1.11540E−04 | 6.52054E−03 | 4.82354E−03 |
| A8 = | −8.05261E−03 | 9.36251E−03 | −1.28046E−04 | −6.50633E−04 |
| A10 = | 7.04579E−04 | −3.77558E−03 | 1.85706E−05 | 5.03266E−05 |
| A12 = | 2.48481E−05 | 5.75870E−04 | 1.46128E−06 | −2.63079E−06 |
| A14 = | −5.10512E−06 | −3.18169E−05 | −5.41596E−07 | 7.71151E−08 |

In Table 1, the curvature radius, the thickness and the focal length are shown in millimeters (mm). Surface numbers 0-18 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
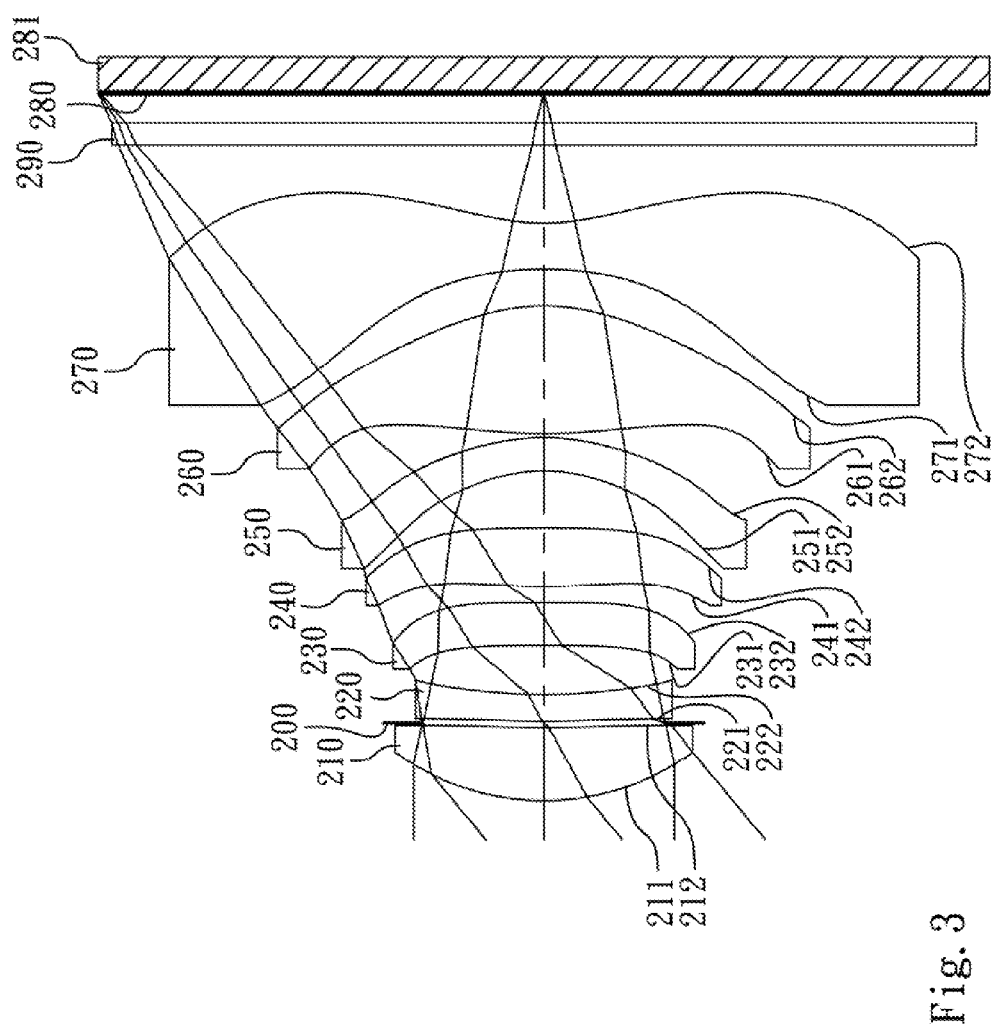
FIG. 3 is a schematic view of an optical image capturing system according to the 2nd embodiment of the present disclosure.
Figure 4:
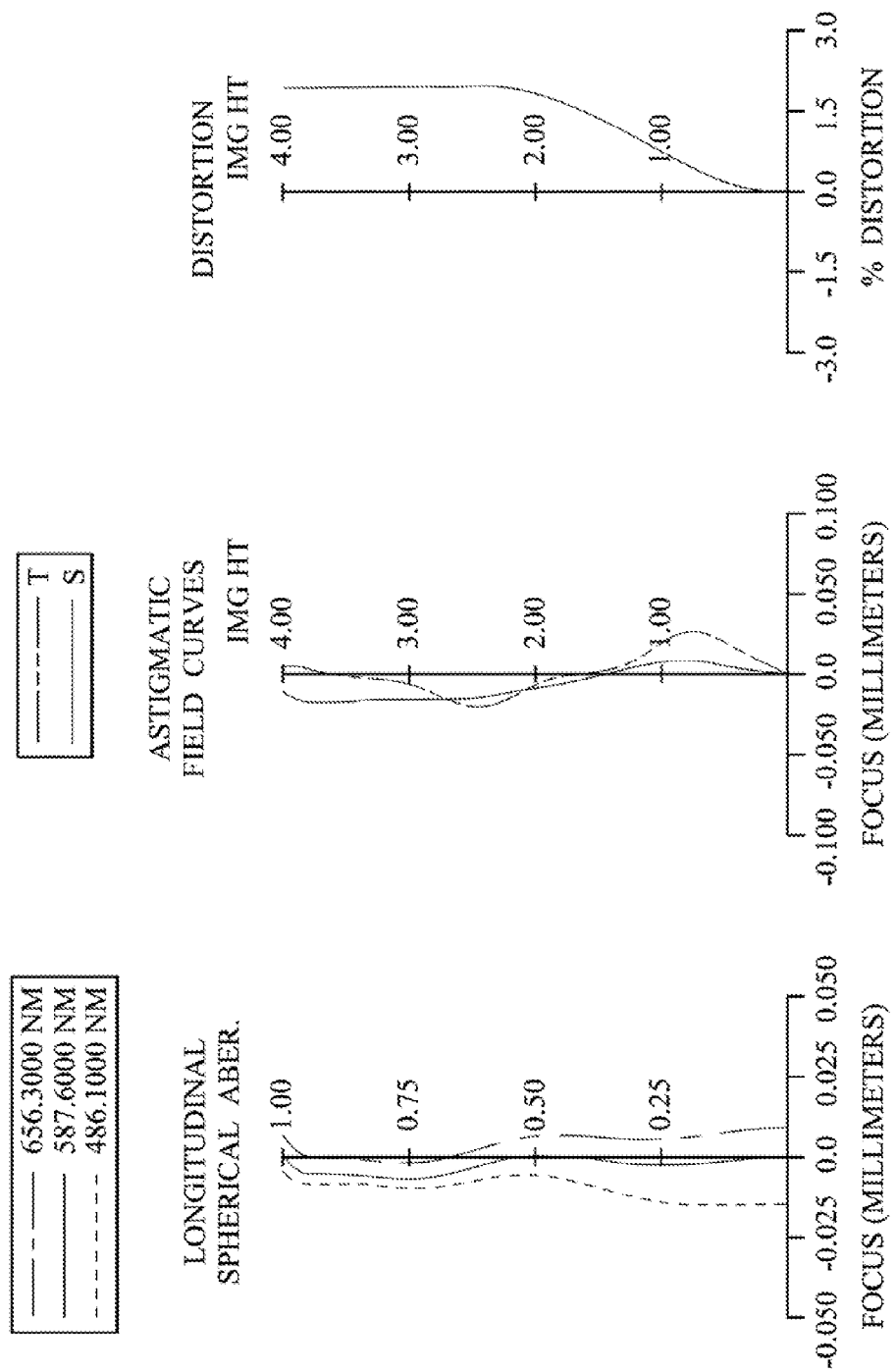
FIG. 4 shows, in order from left to right, spherical aberration curves, astigmatic field curves and a distortion curve of the optical image capturing system according to the 2nd embodiment.

FIG. 3 is a schematic view of an optical image capturing system according to the 2nd embodiment of the present disclosure. FIG. 4 shows, in order from left to right, spherical aberration curves, astigmatic field curves and a distortion curve of the optical image capturing system according to the 2nd embodiment.

In FIG. 3, the optical image capturing system includes, in order from an object side to an image side, a first lens element 210, an aperture stop 200, a second lens element 220, a third lens element 230, a fourth lens element 240, a fifth lens element 250, a sixth lens element 260, a seventh lens element 270, an IR-cut filter 290, an image plane 280 and an image sensor 281.

The first lens element 210 with positive refractive power has a convex object-side surface 211 and a concave image-side surface 212, which are both aspheric, and the first lens element 210 is made of plastic material.

The second lens element 220 with negative refractive power has a convex object-side surface 221 and a concave image-side surface 222, which are both aspheric, and the second lens element 220 is made of plastic material.

The third lens element 230 with negative refractive power has a concave object-side surface 231 and a concave image-side surface 232, which are both aspheric, and the third lens element 230 is made of plastic material.

The fourth lens element 240 with positive refractive power has a convex object-side surface 241 and a convex image-side surface 242, which are both aspheric, and the fourth lens element 240 is made of plastic material. Furthermore, the object-side surface 241 of the fourth lens element 240 includes at least one inflection point.

The fifth lens element 250 with negative refractive power has a concave object-side surface 251 and a convex image-side surface 252, which are both aspheric and the fifth lens element 250 is made of plastic material.

The sixth lens element 260 with positive refractive power has a convex object-side surface 261 and a convex image-side surface 262 which are both aspheric, and the sixth lens element 260 is made of plastic material. The object-side surface 261 changes from convex at a paraxial region to concave at a peripheral region.

The seventh lens element 270 with negative refractive power has a concave object-side surface 271 and a concave image-side surface 272 which are both aspheric, and the seventh lens element 270 is made of plastic material. The image-side surface 272 changes from concave at a paraxial region to convex at a peripheral region. Furthermore, the image-side surface 272 of the seventh lens element 270 includes at least one inflection point.

The IR-cut filter 290 is made of glass and located between the seventh lens element 270 and the image plane 280, and will not affect the focal length of the optical image capturing system.

The detailed optical data of the 2nd embodiment are shown in Table 3 and the aspheric surface data are shown in Table 4 below.

TABLE 3

2nd Embodiment
f = 4.69 mm, Fno = 2.00, HFOV = 39.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.338420 | (ASP) | 0.661 | Plastic | 1.544 | 55.9 | 5.34 |
| 2 | | 10.750800 | (ASP) | 0.040 | | | | |
| 3 | Ape. Stop | Plano | | 0.016 | | | | |
| 4 | Lens 2 | 7.445700 | (ASP) | 0.240 | Plastic | 1.640 | 23.3 | −17.26 |
| 5 | | 4.391600 | (ASP) | 0.445 | | | | |
| 6 | Lens 3 | −21.710900 | (ASP) | 0.381 | Plastic | 1.544 | 55.9 | −39.74 |
| 7 | | 5361.416200 | (ASP) | 0.147 | | | | |
| 8 | Lens 4 | 5.575000 | (ASP) | 0.529 | Plastic | 1.544 | 55.9 | 7.69 |
| 9 | | −16.175800 | (ASP) | 0.515 | | | | |
| 10 | Lens 5 | −1.284340 | (ASP) | 0.300 | Plastic | 1.650 | 21.4 | −8.44 |
| 11 | | −1.831180 | (ASP) | 0.035 | | | | |
| 12 | Lens 6 | 4.475500 | (ASP) | 1.150 | Plastic | 1.544 | 55.9 | 2.49 |
| 13 | | −1.763930 | (ASP) | 0.325 | | | | |
| 14 | Lens 7 | −3.393300 | (ASP) | 0.420 | Plastic | 1.544 | 55.9 | −2.12 |
| 15 | | 1.819780 | (ASP) | 0.700 | | | | |
| 16 | IR-cut filter | Plano | | 0.200 | Glass | 1.517 | 64.2 | — |
| 17 | | Plano | | 0.272 | | | | |
| 18 | Image | Plano | | — | | | | |

Note:
Reference wavelength (d-line) is 587.6 nm.

TABLE 4

Aspheric Coefficients

| Surface # | 1 | 2 | 4 | 5 | 6 |
|---|---|---|---|---|---|
| k = | 9.80773E−01 | −1.92188E+01 | 8.90606E+00 | −1.79159E+00 | 0.00000E+00 |
| A4 = | −2.18593E−03 | −6.46057E−02 | −1.16054E−01 | −4.86404E−02 | −3.93493E−02 |
| A6 = | −1.54070E−02 | 7.63918E−02 | 1.13450E−01 | 5.13025E−02 | −1.80331E−02 |
| A8 = | 3.05338E−02 | 4.29638E−02 | −6.80130E−02 | −3.24642E−02 | 4.67850E−03 |
| A10 = | −3.36226E−02 | −2.10201E−03 | 8.54602E−03 | 1.32076E−02 | −9.93176E−03 |
| A12 = | 1.79152E−02 | 1.22516E−02 | 1.21194E−02 | −2.83179E−03 | |
| A14 = | −4.00474E−03 | −3.93519E−03 | 4.15964E−03 | 1.09867E−03 | |

| Surface # | 7 | 8 | 9 | 10 | 11 |
|---|---|---|---|---|---|
| k = | 0.00000E+00 | −5.00000E+01 | −1.99836E+01 | −2.35110E+00 | −5.56653E+00 |
| A4 = | −9.08185E−02 | −4.85174E−02 | −2.66060E−02 | 1.14859E−01 | 2.33258E−02 |
| A6 = | 1.74613E−02 | −1.31630E−02 | −3.07938E−02 | −1.72783E−01 | 5.37931E−02 |
| A8 = | −1.60883E−02 | 5.98634E−03 | 6.93109E−03 | 9.45890E−02 | 2.74189E−02 |
| A10 = | 1.15200E−03 | −1.00384E−03 | 7.89597E−04 | −4.12706E−02 | −1.10956E−02 |
| A12 = | | −1.22616E−03 | −3.12044E−04 | 1.37733E−02 | 2.94183E−03 |
| A14 = | | 5.23056E−04 | 1.91696E−05 | −1.93858E−03 | −2.89735E−04 |

| Surface # | 12 | 13 | 14 | 15 |
|---|---|---|---|---|
| k = | 1.11152E−01 | −5.90226E+00 | −3.47383E+00 | −9.89411E+00 |
| A4 = | −6.66847E−02 | −2.36853E−02 | −5.03202E−02 | −2.43023E−02 |
| A6 = | 2.67368E−02 | −4.13868E−03 | 7.31438E−03 | 4.35401E−03 |
| A8 = | −7.42114E−03 | 9.41497E−03 | −1.79551E−04 | −6.10939E−04 |
| A10 = | 5.58018E−04 | 3.69867E−03 | 3.41602E−06 | 5.28792E−05 |
| A12 = | −1.77933E−05 | 5.80183E−04 | 1.46128E−06 | −2.74531E−06 |
| A14 = | 5.57785E−06 | 3.25579E−05 | 3.73207E−07 | 6.39095E−08 |

In the 2nd embodiment, the equation of the aspheric surface profiles of the aforementioned lens elements is the same as the equation of the 1st embodiment. Also, the definitions of f, Fno, HFOV, V1, V2, CTmin, R13, R14, f3, f4, f6, f7, SAG52, CT5, Yc72, Td, FOV, TTL and ImgH are the same as those stated in the 1st embodiment with corresponding values for the 2nd embodiment, so an explanation in this regard will not be provided again.

Moreover, these parameters can be calculated from Table 3 and Table 4 as the following values and satisfy the following relationships:

| 2nd Embodiment | | | |
|---|---|---|---|
| f (mm) | 4.69 | |f/f6| + |f/f7| | 4.10 |
| Fno | 2.00 | f/f7 | −2.22 |
| HFOV (Deg.) | 39.9 | SAG52 + CT5 (mm) | −0.44 |
| V1−V2 | 32.6 | Yc72/f | 0.40 |
| CTmin (mm) | 0.240 | Td/f | 1.11 |
| R14/R13 | −0.54 | FOV (Deg.) | 79.8 |
| R14/f | 0.39 | TTL/ImgH | 1.58 |
| |f/f3| + |f/f4| | 0.73 | | |

3rd Embodiment

Figure 5:
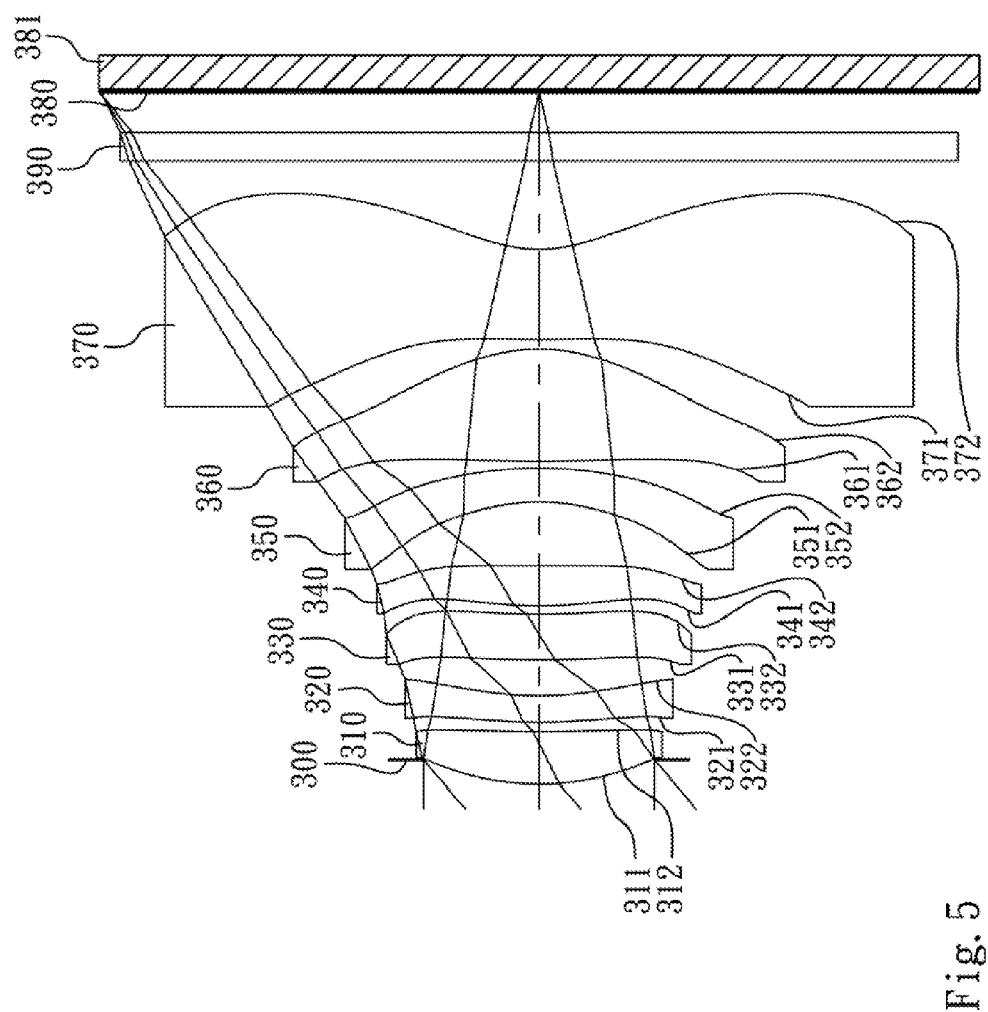
FIG. 5 is a schematic view of an optical image capturing system according to the 3rd embodiment of the present disclosure.
Figure 6:
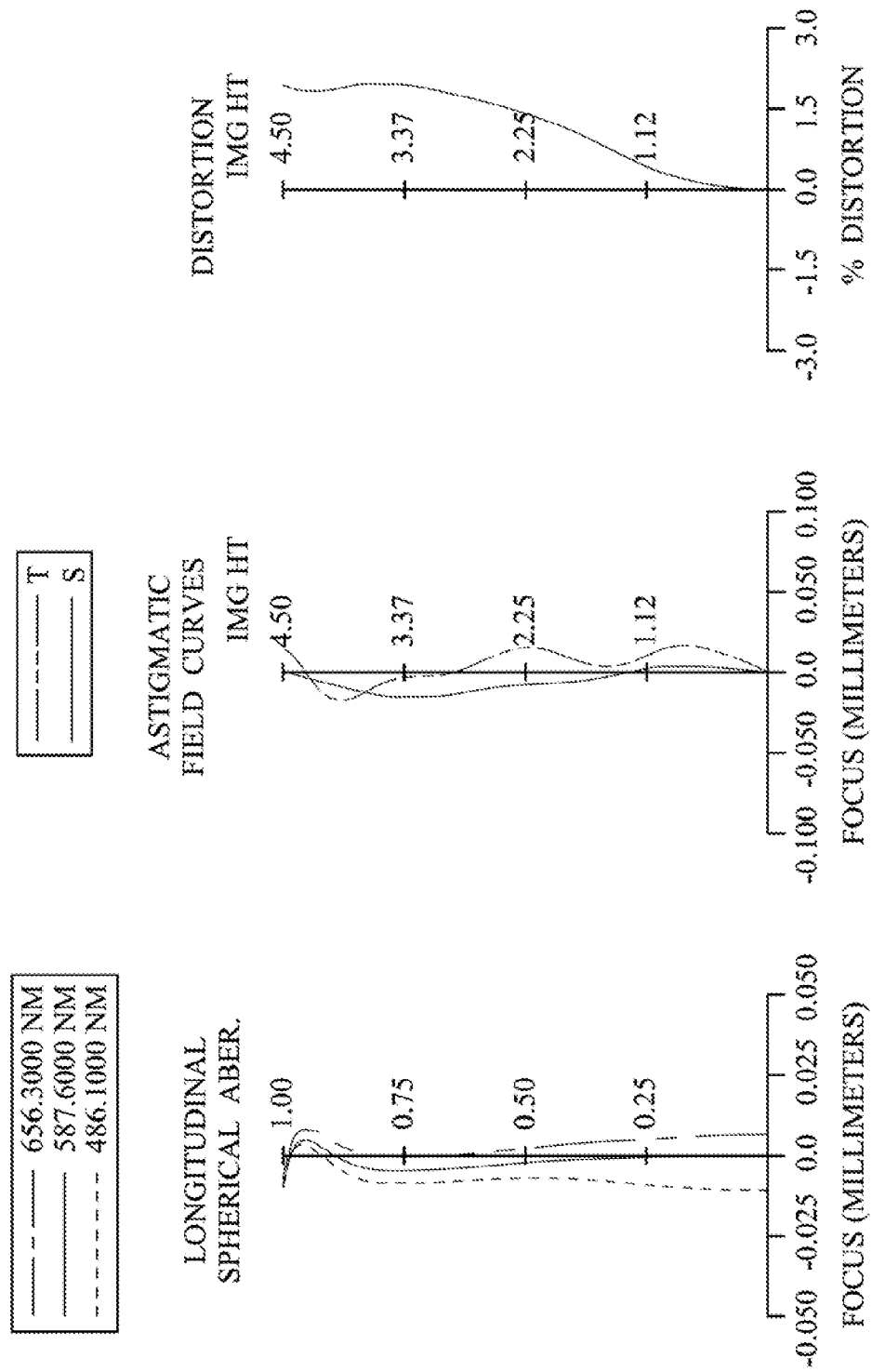
FIG. 6 shows, in order from left to right, spherical aberration curves, astigmatic field curves and a distortion curve of the optical image capturing system according to the 3rd embodiment.

FIG. 5 is a schematic view of an optical image capturing system according to the 3rd embodiment of the present disclosure. FIG. 6 shows, in order from left to right, spherical aberration curves, astigmatic field curves and a distortion curve of the optical image capturing system according to the 3rd embodiment.

In FIG. 5, the optical image capturing system includes, in order from an object side to an image side, an aperture stop 300, a first lens element 310, a second lens element 320, a third lens element 330, a fourth lens element 340, a fifth lens element 350, a sixth lens element 360, a seventh lens element 370, an IR-cut filter 390, an image plane 380 and an image sensor 381.

The first lens element 310 with positive refractive power has a convex object-side surface 311 and a concave image-side surface 312, which are both aspheric, and the first lens element 310 is made of plastic material.

The second lens element 320 with negative refractive power has a convex object-side surface 321 and a concave image-side surface 322, which are both aspheric, and the second lens element 320 is made of plastic material.

The third lens element 330 with negative refractive power has a convex object-side surface 331 and a concave image-side surface 332, which are both aspheric, and the third lens element 330 is made of plastic material.

The fourth lens element 340 with positive refractive power has a convex object-side surface 341 and a concave image-side surface 342, which are both aspheric, and the fourth lens element 340 is made of plastic material. Furthermore, the fourth lens element 340 has at least one inflection point.

The fifth lens element 350 with negative refractive power has a concave object-side surface 351 and a convex image-side surface 352, which are both aspheric, and the fifth lens element 350 is made of plastic material.

The sixth lens element 360 with positive refractive power has a convex object-side surface 361 and a convex image-side surface 362 which are both aspheric, and the object-side surface 361 changes from convex at a paraxial region to concave at a peripheral region. The sixth lens element 360 is made of plastic material.

The seventh lens element 370 with negative refractive power has a convex object-side surface 371 and a concave image-side surface 372 which are both aspheric, and the seventh lens element 370 is made of plastic material. The image-side surface 372 changes from concave at a paraxial region to convex at a peripheral region. Furthermore, the image-side surface 372 of the seventh lens element 370 includes at least one inflection point.

The IR-cut filter 390 is made of glass, and located between the seventh lens element 370 and the image plane 380, and will not affect the focal length of the optical image capturing system.

The detailed optical data of the 3rd embodiment are shown in Table 5 and the aspheric surface data are shown in Table 6 below.

TABLE 5

3rd Embodiment
f = 5.20 mm, Fno = 2.20, HFOV = 40.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.247 | | | | |
| 2 | Lens 1 | 2.767090 | (ASP) | 0.539 | Plastic | 1.544 | 55.9 | 6.38 |
| 3 | | 12.665200 | (ASP) | 0.099 | | | | |
| 4 | Lens 2 | 5.044800 | (ASP) | 0.270 | Plastic | 1.634 | 23.8 | −15.43 |
| 5 | | 3.259300 | (ASP) | 0.368 | | | | |
| 6 | Lens 3 | 10.920300 | (ASP) | 0.462 | Plastic | 1.544 | 55.9 | −34.51 |
| 7 | | 6.802200 | (ASP) | 0.085 | | | | |
| 8 | Lens 4 | 3.989400 | (ASP) | 0.419 | Plastic | 1.544 | 55.9 | 7.64 |
| 9 | | 96.088900 | (ASP) | 0.646 | | | | |
| 10 | Lens 5 | −2.064730 | (ASP) | 0.350 | Plastic | 1.634 | 23.8 | −8.46 |
| 11 | | −3.577300 | (ASP) | 0.070 | | | | |
| 12 | Lens 6 | 10.886400 | (ASP) | 1.152 | Plastic | 1.535 | 56.3 | 2.85 |
| 13 | | −1.703910 | (ASP) | 0.097 | | | | |
| 14 | Lens 7 | 15.384600 | (ASP) | 0.923 | Plastic | 1.535 | 56.3 | −2.80 |
| 15 | | 1.336710 | (ASP) | 0.900 | | | | |
| 16 | IR-cut filter | Plano | | 0.300 | Glass | 1.517 | 64.2 | — |
| 17 | | Plano | | 0.422 | | | | |
| 18 | Image | Plano | | — | | | | |

Note:
Reference wavelength (d-line) is 587.6 nm.

TABLE 6

Aspheric Coefficients

| Surface # | 2 | 3 | 4 | 5 | 6 |
|---|---|---|---|---|---|
| k = | 3.52553E−01 | −3.37368E+01 | −9.47575E+00 | −6.02858E+00 | 3.00000E+00 |
| A4 = | −1.85103E−03 | 4.12408E−02 | −8.08093E−02 | −4.19419E−02 | −9.49326E−03 |
| A6 = | −3.40118E−03 | 4.54419E−02 | 6.96078E−02 | 3.07246E−02 | −1.02428E−02 |
| A8 = | 7.83761E−03 | −2.38616E−02 | −3.13092E−02 | −1.31529E−02 | 1.38652E−03 |
| A10 = | −1.11780E−02 | −2.38325E−03 | 5.29695E−04 | 2.75455E−03 | 1.05695E−03 |

TABLE 6-continued

Aspheric Coefficients

| A12 = | 7.49400E−03 | 7.59632E−03 | 5.01418E−03 | −1.11157E−03 | |
| A14 = | −2.25623E−03 | −3.29843E−03 | −2.22181E−03 | 2.12214E−04 | |

| Surface # | 7 | 8 | 9 | 10 | 11 |
|---|---|---|---|---|---|
| k = | −6.24200E−01 | −1.60325E+01 | −2.00000E+01 | −1.50067E+00 | −8.16413E+00 |
| A4 = | −4.44571E−02 | −2.44682E−02 | −1.02379E−02 | 8.48765E−02 | 2.22208E−02 |
| A6 = | 3.51367E−03 | −1.31705E−02 | −2.07363E−02 | −8.98396E−02 | −3.01459E−02 |
| A8 = | −3.87828E−03 | 3.00348E−03 | 3.71865E−03 | 4.18718E−02 | 1.25384E−02 |
| A10 = | −3.59950E−04 | −6.35328E−04 | 2.26563E−04 | −1.47834E−02 | −3.88355E−03 |
| A12 = | | −4.41456E−04 | −4.60637E−05 | 3.82222E−03 | 8.20642E−04 |
| A14 = | | 1.91129E−04 | 5.60135E−05 | −4.33119E−04 | −6.93937E−05 |

| Surface # | 12 | 13 | 14 | 15 |
|---|---|---|---|---|
| k = | −1.55961E+01 | −5.41368E+00 | −1.00000E+00 | −4.99510E+00 |
| A4 = | −3.68193E−02 | −2.75200E−02 | −5.52252E−02 | −2.04338E−02 |
| A6 = | 1.63940E−02 | 1.17221E−03 | 8.08138E−03 | 3.00855E−03 |
| A8 = | −4.13324E−03 | 4.36791E−03 | −2.17936E−04 | −3.08074E−04 |
| A10 = | 3.21097E−04 | −1.34050E−03 | −2.60573E−05 | 1.95617E−05 |
| A12 = | 1.44523E−05 | 1.57879E−04 | −8.43969E−07 | −7.52512E−07 |
| A14 = | −2.23880E−06 | −7.06951E−06 | 1.80932E−07 | 1.29525E−08 |

In the 3rd embodiment, the equation of the aspheric surface profiles of the aforementioned lens elements is the same as the equation of the 1st embodiment. Also, the definitions of, Fno, HFOV, V1, V2, CTmin, R13, R14, f3, f4, f6, f7, SAG52, CT5, Yc72, Td, FOV, TTL and ImgH are the same as those stated in the 1st embodiment with corresponding values for the 3rd embodiment, so an explanation in this regard will not be provided again.

Moreover, these parameters can be calculated from Table 5 and Table 6 as the following values and satisfy the following relationships:

| 3rd Embodiment | | | |
|---|---|---|---|
| f (mm) | 5.20 | |f/f6| + |f/f7| | 3.68 |
| Fno | 2.20 | f/f7 | −1.85 |
| HFOV (deg.) | 40.3 | SAG52 + CT5 (mm) | −0.16 |
| V1 − V2 | 32.1 | Yc72/f | 0.49 |
| CTmin (mm) | 0.270 | Td/f | 1.05 |
| R14/R13 | 0.09 | FOV (deg.) | 80.6 |
| R14/f | 0.26 | TTL/ImgH | 1.56 |
| |f/f3| + |f/f4| | 0.83 | | |

4th Embodiment

Figure 7:
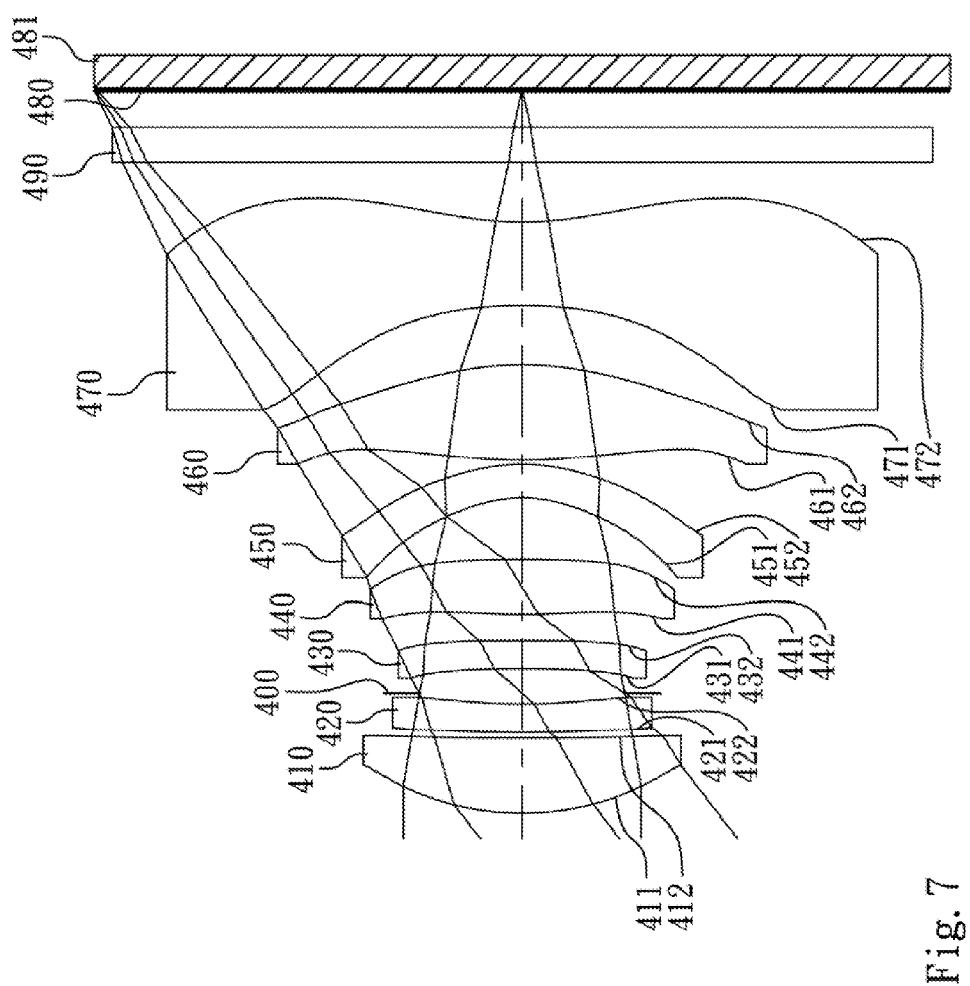
FIG. 7 is a schematic view of an optical image capturing system according to the 4th embodiment of the present disclosure.
Figure 8:
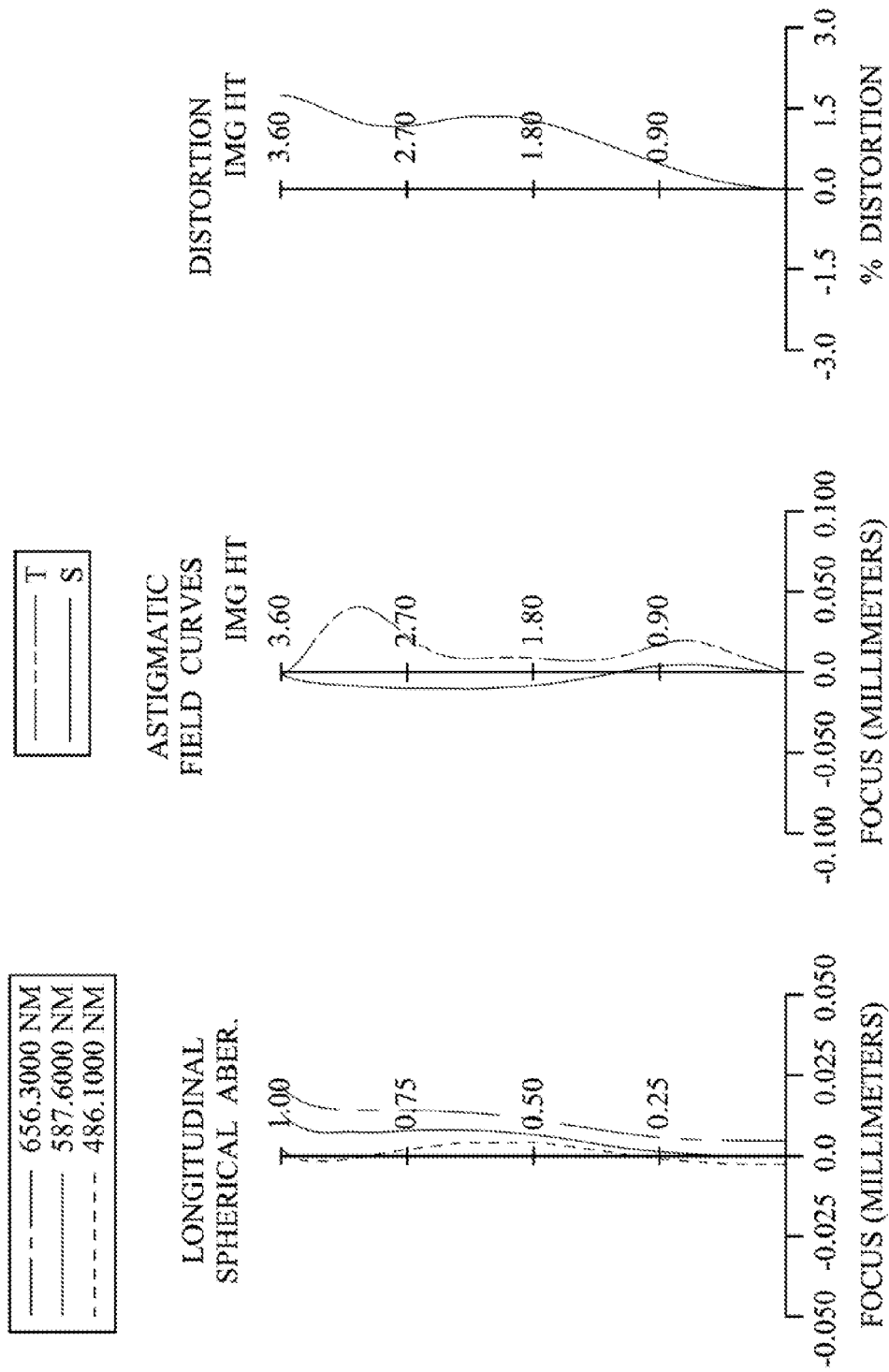
FIG. 8 shows, in order from left to right, spherical aberration curves, astigmatic field curves and a distortion curve of the optical image capturing system according to the 4th embodiment.

FIG. 7 is a schematic view of an optical image capturing system according to the 4th embodiment of the present disclosure. FIG. 8 shows, in order from left to right, spherical aberration curves, astigmatic field curves and a distortion curve of the optical image capturing system according to the 4th embodiment.

In FIG. 7, the optical image capturing system includes, in order from an object side to an image side, a first lens element 410, a second lens element 420, an aperture stop 400, a third lens element 430, a fourth lens element 440, a fifth lens element 450, a sixth lens element 460, a seventh lens element 470, an IR-cut filter 490, an image plane 480 and an image sensor 481.

The first lens element 410 with positive refractive power has a convex object-side surface 411 and a concave image-side surface 412, which are both aspheric, and the first lens element 410 is made of plastic material.

The second lens element 420 with negative refractive power has a convex object-side surface 421 and a concave image-side surface 422, which are both aspheric, and the second lens element 420 is made of plastic material.

The third lens element 430 with negative refractive power has a concave object-side surface 431 and a convex image-side surface 432, which are both aspheric, and the third lens element 430 is made of plastic material.

The fourth lens element 440 with positive refractive power has a convex object-side surface 441 and a convex image-side surface 442, which are both aspheric, and the fourth lens element 440 is made of plastic material. Furthermore, the object-side surface 441 of the fourth lens element 440 includes at least one inflection point.

The fifth lens element 450 with negative refractive power has a concave object-side surface 451 and a convex image-side surface 452, which are both aspheric, and the fifth lens element 450 is made of plastic material.

The sixth lens element 460 with positive refractive power has a convex object-side surface 461 and a convex image-side surface 462 which are both aspheric, and the object-side surface 461 changes from convex at a paraxial region to concave at a peripheral region. The sixth lens element 460 is made of plastic material.

The seventh lens element 470 with negative refractive power has a concave object-side surface 471 and a concave image-side surface 472 which are both aspheric, and the seventh lens element 470 is made of plastic material. The image-side surface 472 changes from concave at a paraxial region to convex at a peripheral region. Furthermore, the image-side surface 472 of the seventh lens element 470 includes at least one inflection point.

The IR-cut filter 490 is made of glass and located between the seventh lens element 470 and the image plane 480, and will not affect the focal length of the optical image capturing system.

The detailed optical data of the 4th embodiment are shown in Table 7 and the aspheric surface data are shown in Table 8 below.

TABLE 7

4th Embodiment
f = 4.61 mm, Fno = 2.30, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.389670 (ASP) | 0.633 | Plastic | 1.544 | 55.9 | 4.60 |
| 2 | | 46.838100 (ASP) | 0.047 | | | | |
| 3 | Lens 2 | 8.712400 (ASP) | 0.240 | Plastic | 1.640 | 23.3 | −15.14 |
| 4 | | 4.537300 (ASP) | 0.091 | | | | |
| 5 | Ape. Stop | Plano | 0.208 | | | | |
| 6 | Lens 3 | −12.471700 (ASP) | 0.237 | Plastic | 1.640 | 23.3 | −26.34 |
| 7 | | −48.317500 (ASP) | 0.222 | | | | |
| 8 | Lens 4 | 6.178900 (ASP) | 0.462 | Plastic | 1.544 | 55.9 | 8.37 |
| 9 | | −16.846700 (ASP) | 0.521 | | | | |
| 10 | Lens 5 | −1.097580 (ASP) | 0.280 | Plastic | 1.650 | 21.4 | −8.13 |
| 11 | | −1.524590 (ASP) | 0.035 | | | | |
| 12 | Lens 6 | 4.355700 (ASP) | 0.802 | Plastic | 1.544 | 55.9 | 3.20 |
| 13 | | −2.706150 (ASP) | 0.504 | | | | |
| 14 | Lens 7 | −4.028200 (ASP) | 0.703 | Plastic | 1.535 | 56.3 | −2.82 |
| 15 | | 2.559930 (ASP) | 0.500 | | | | |
| 16 | IR-cut filter | Plano | 0.300 | Glass | 1.517 | 64.2 | — |
| 17 | | Plano | 0.315 | | | | |
| 18 | Image | Plano | — | | | | |

Note:
Reference wavelength (d-line) is 587.6 nm.

TABLE 8

Aspheric Coefficients

| | Surface # | | | | |
|---|---|---|---|---|---|
| | 1 | 2 | 3 | 4 | 6 |
| k = | 1.57610E+00 | 0.00000E+00 | 2.24432E+01 | −9.81610E+00 | 0.00000E+00 |
| A4 = | −7.07207E−03 | −2.87756E−02 | −9.04706E−02 | −6.10678E−02 | −4.44285E−02 |
| A6 = | −1.73645E−02 | 7.01684E−02 | 1.09158E−01 | 3.92193E−02 | −2.89024E−03 |
| A8 = | 2.79532E−02 | −4.79826E−02 | −7.54503E−02 | −9.10816E−03 | 3.45020E−03 |
| A10 = | −3.14039E−02 | −9.04108E−04 | 9.41003E−03 | −1.62587E−02 | −1.87971E−02 |
| A12 = | 1.74531E−02 | 1.24907E−02 | 1.80847E−02 | 1.36062E−02 | |
| A14 = | −4.70458E−03 | −3.66630E−03 | −5.00907E−03 | 1.38208E−03 | |

| | Surface # | | | | |
|---|---|---|---|---|---|
| | 7 | 8 | 9 | 10 | 11 |
| k = | 0.00000E+00 | −2.96150E+01 | −2.00000E+01 | −2.26652E+00 | −4.54917E+00 |
| A4 = | −6.62324E−02 | −7.68638E−02 | −5.17014E−02 | 1.10874E−01 | 1.52213E−02 |
| A6 = | 2.37827E−02 | 1.57132E−04 | −3.08132E−02 | −1.74659E−01 | −5.08872E−02 |
| A8 = | −3.96313E−03 | 6.90401E−03 | 6.97349E−03 | 9.48529E−02 | 2.77209E−02 |
| A10 = | −1.35674E−02 | −1.61108E−03 | 1.31243E−02 | −4.06977E−02 | −1.11489E−02 |
| A12 = | | −4.41316E−04 | −2.05109E−04 | 1.37104E−02 | 2.97559E−03 |
| A14 = | | 3.73746E−04 | 1.46854E−04 | −2.37068E−03 | −2.24668E−04 |

| | Surface # | | | |
|---|---|---|---|---|
| | 12 | 13 | 14 | 15 |
| k = | 1.18222E+00 | −4.28114E+00 | −1.42975E+00 | −1.14325E+01 |
| A4 = | −6.34381E−02 | 7.42374E−03 | −4.49002E−02 | −2.28851E−02 |
| A6 = | 2.49561E−02 | −8.55673E−03 | 7.09692E−03 | 3.88514E−03 |
| A8 = | −7.40096E−03 | 8.95202E−03 | −3.08539E−04 | −6.48704E−04 |
| A10 = | 5.43575E−04 | −3.66943E−03 | 1.94081E−05 | 5.58332E−05 |
| A12 = | −2.86123E−05 | 5.92930E−04 | 7.86735E−06 | −1.82732E−06 |
| A14 = | 1.63381E−05 | −2.99776E−05 | −6.29814E−07 | −9.15485E−09 |

In the 4th embodiment, the equation of the aspheric surface profiles of the aforementioned lens elements is the same as the equation of the 1st embodiment. Also, the definitions off, Fno, HFOV, V1, V2, CTmin, R13, R14, f3, f4, f6, f7, SAG52, CT5, Yc72, Td, FOV, TTL and ImgH are the same as those stated in the 1st embodiment with corresponding values for the 4th embodiment, so an explanation in this regard will not be provided again.

Moreover, these parameters can be calculated from Table 7 and Table 8 as the following values and satisfy the following relationships:

| 4th Embodiment | | | |
|---|---|---|---|
| f (mm) | 4.61 | \|f/f6\| + \|f/f7\| | 3.07 |
| Fno | 2.30 | f/f7 | −1.63 |
| HFOV (deg.) | 37.5 | SAG52 + CT5 (mm) | −0.32 |
| V1 − V2 | 32.6 | Yc72/f | 0.37 |
| CTmin (mm) | 0.237 | Td/f | 1.08 |
| R14/R13 | −0.64 | FOV (deg.) | 75.0 |
| R14/f | 0.56 | TTL/ImgH | 1.67 |
| \|f/f3\| + \|f/f4\| | 0.73 | | |

5th Embodiment

Figure 9:
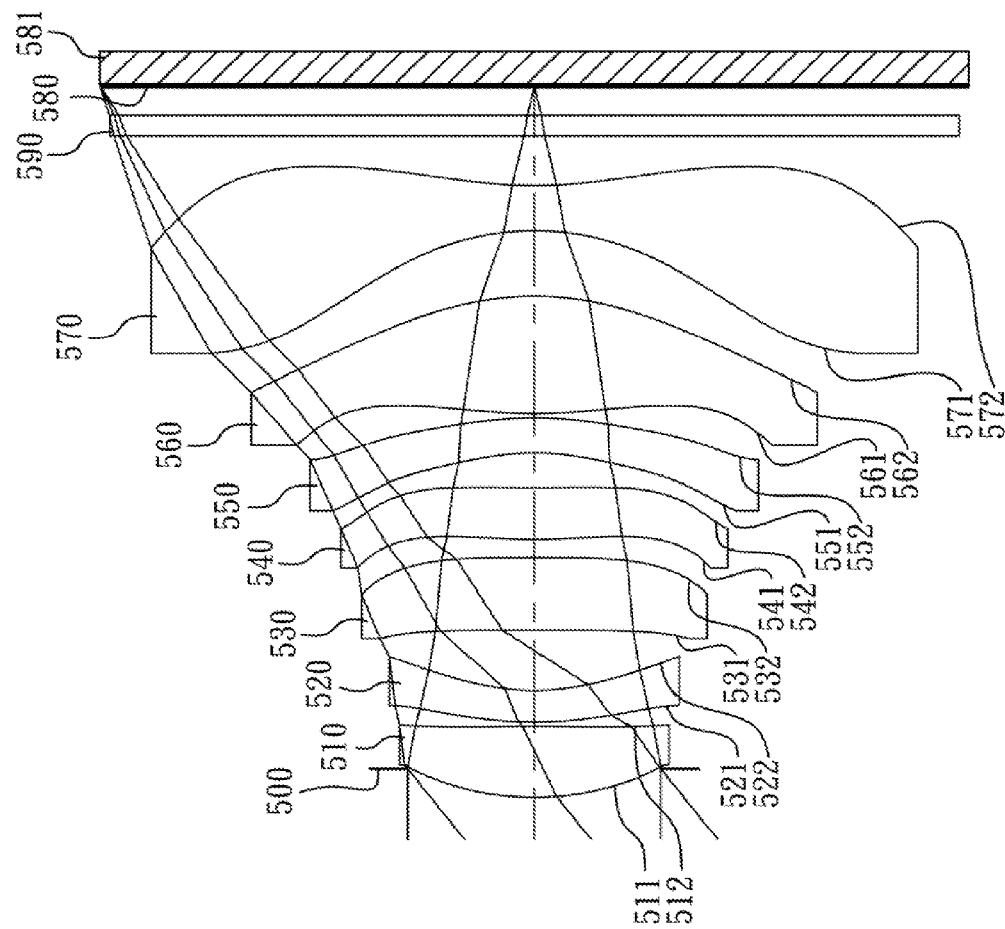
FIG. 9 is a schematic view of an optical image capturing system according to the 5th embodiment of the present disclosure.
Figure 10:
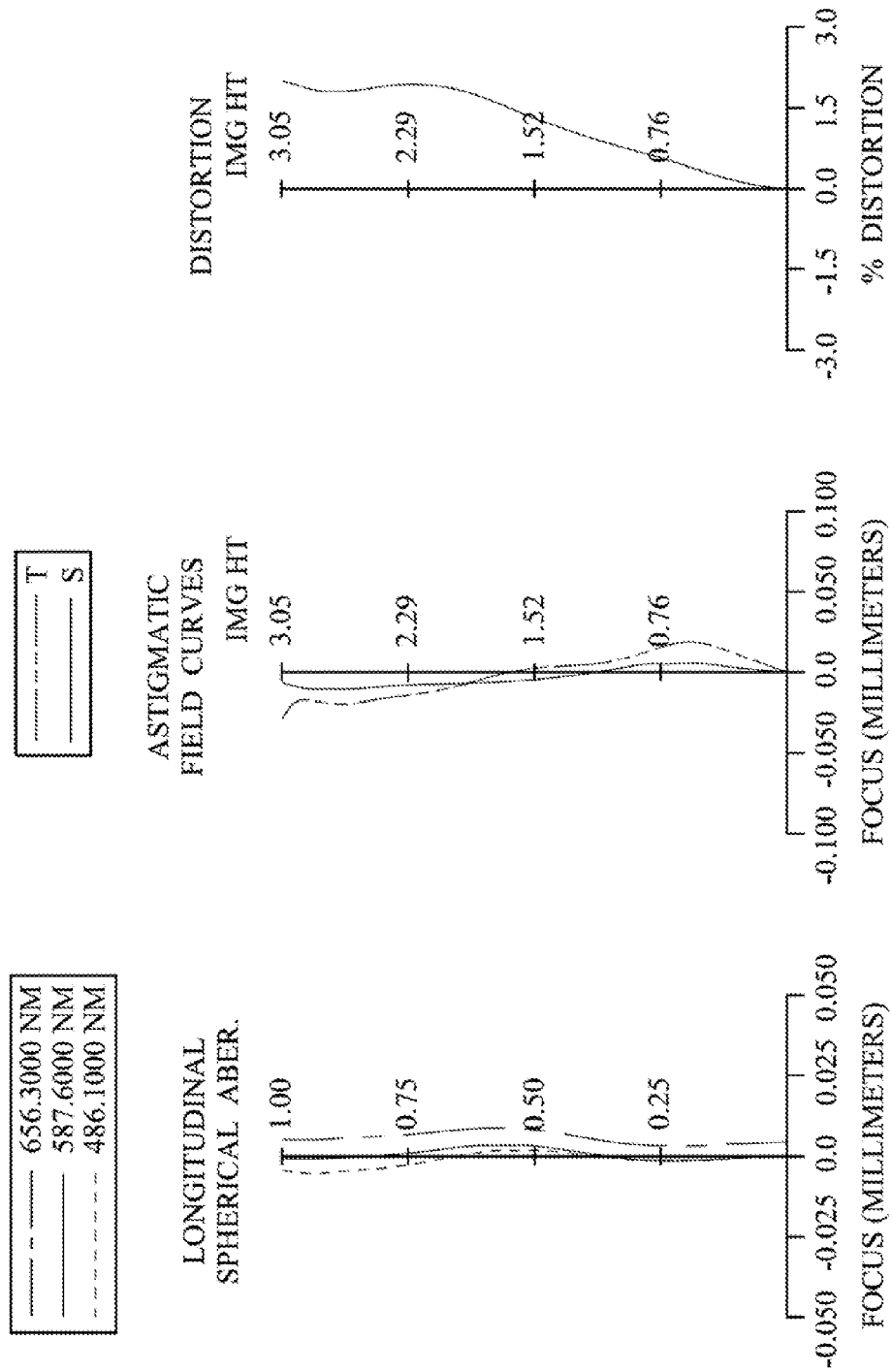
FIG. 10 shows, in order from left to right, spherical aberration curves, astigmatic field curves and a distortion curve of the optical image capturing system according to the 5th embodiment.

FIG. 9 is a schematic view of an optical image capturing system according to the 5th embodiment of the present disclosure. FIG. 10 shows, in order from left to right, spherical aberration curves, astigmatic field curves and a distortion curve of the optical image capturing system according to the 5th embodiment.

In FIG. 9, the optical image capturing system includes, in order from an object side to an image side, an aperture stop 500, a first lens element 510, a second lens element 520, a third lens element 530, a fourth lens element 540, a fifth lens element 550, a sixth lens element 560, a seventh lens element 570, an IR-cut filter 590, an image plane 580 and an image sensor 581.

The first lens element 510 with positive refractive power has a convex object-side surface 511 and a convex image-side surface 512, which are both aspheric, and the first lens element 510 is made of plastic material.

The second lens element 520 with negative refractive power has a convex object-side surface 521 and a concave image-side surface 522, which are both aspheric, and the second lens element 520 is made of plastic material.

The third lens element 530 with positive refractive power has a convex object-side surface 531 and a convex image-side surface 532, which are both aspheric, and the third lens element 530 is made of plastic material.

The fourth lens element 540 with positive refractive power has a convex object-side surface 541 and a concave image-side surface 542, which are both aspheric, and the fourth lens element 540 is made of plastic material. Furthermore, the fourth lens element 540 includes at least one inflection point.

The fifth lens element 550 with negative refractive power has a concave object-side surface 551 and a convex image-side surface 552, which are both aspheric, and the fifth lens element 550 is made of plastic material.

The sixth lens element 560 with positive refractive power has a convex object-side surface 561 and a convex image-side surface 562 which are both aspheric, and the object-side surface 561 changes from convex at a paraxial region to concave at a peripheral region. The sixth lens element 560 is made of plastic material.

The seventh lens element 570 with negative refractive power has a concave object-side surface 571 and a concave image-side surface 572 which are both aspheric, and the seventh lens element 570 is made of plastic material. The image-side surface 572 changes from concave at a paraxial region to convex at a peripheral region. Furthermore, the image-side surface 572 of the seventh lens element 570 includes at least one inflection point.

The IR-cut filter 590 is made of glass and located between the seventh lens element 570 and the image plane 580, and will not affect the focal length of the optical image capturing system.

The detailed optical data of the 5th embodiment are shown in Table 9 and the aspheric surface data are shown in Table 10 below.

TABLE 9

5th Embodiment
f = 3.74 mm, Fno = 2.10, HFOV = 38.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.200 | | | | |
| 2 | Lens 1 | 2.036410 (ASP) | 0.498 | Plastic | 1.544 | 55.9 | 3.47 |
| 3 | | −23.551600 (ASP) | 0.030 | | | | |
| 4 | Lens 2 | 2.627980 (ASP) | 0.220 | Plastic | 1.650 | 21.4 | −7.14 |
| 5 | | 1.622050 (ASP) | 0.426 | | | | |
| 6 | Lens 3 | 248.664500 (ASP) | 0.508 | Plastic | 1.544 | 55.9 | 69.73 |
| 7 | | −44.742700 (ASP) | 0.132 | | | | |
| 8 | Lens 4 | 4.625300 (ASP) | 0.365 | Plastic | 1.544 | 55.9 | 10.43 |
| 9 | | 24.281800 (ASP) | 0.241 | | | | |
| 10 | Lens 5 | −1.596190 (ASP) | 0.250 | Plastic | 1.650 | 21.4 | −8.74 |
| 11 | | −2.357310 (ASP) | 0.030 | | | | |
| 12 | Lens 6 | 3.574000 (ASP) | 0.825 | Plastic | 1.544 | 55.9 | 2.53 |
| 13 | | −2.063240 (ASP) | 0.457 | | | | |
| 14 | Lens 7 | −1.894410 (ASP) | 0.320 | Plastic | 1.544 | 55.9 | −2.04 |
| 15 | | 2.837640 (ASP) | 0.350 | | | | |
| 16 | IR-cut filter | Plano | 0.145 | Glass | 1.517 | 64.2 | — |
| 17 | | Plano | 0.204 | | | | |
| 18 | Image | Plano | — | | | | |

Note:
Reference wavelength (d-line) is 587.6 nm.

TABLE 10

Aspheric Coefficients

| Surface # | | | | | |
|---|---|---|---|---|---|
| | 2 | 3 | 4 | 5 | 6 |
| k = | 2.20625E+00 | −1.00000E+00 | 7.37774E−01 | −4.60870E+00 | −8.50000E+00 |
| A4 = | −1.75513E−02 | 3.06838E−02 | −1.27831E−01 | −3.67140E−02 | −2.57989E−02 |
| A6 = | −3.96576E−02 | 5.61015E−02 | 1.53096E−01 | 9.14770E−02 | −1.55297E−02 |
| A8 = | 8.70611E−02 | −1.17110E−01 | −1.43188E−01 | −1.02582E−01 | 2.26274E−02 |
| A10 = | −1.76322E−01 | 9.72894E−02 | −1.49053E−02 | 5.13291E−02 | −3.91197E−02 |
| A12 = | 1.67677E−01 | −2.38813E−02 | 1.03153E−01 | −1.57919E−02 | 1.70202E−02 |
| A14 = | −7.01622E−02 | −9.74824E−03 | −5.68855E−02 | 3.40552E−03 | |

| Surface # | | | | | |
|---|---|---|---|---|---|
| | 7 | 8 | 9 | 10 | 11 |
| k = | −1.00000E+00 | −1.25015E+01 | −1.00000E+00 | −3.56188E+00 | −1.35942E+01 |
| A4 = | −1.05499E−01 | −1.38805E−01 | −6.34312E−02 | 2.42110E−01 | 8.14332E−02 |
| A6 = | 3.32319E−02 | 4.14127E−03 | −4.60031E−02 | −3.21783E−01 | −1.10006E−01 |
| A8 = | −1.93231E−02 | 1.53781E−02 | 1.16320E−02 | 2.32868E−01 | 6.91190E−02 |
| A10 = | −7.07693E−03 | −1.01486E−02 | −2.46831E−03 | −1.42663E−01 | −3.64787E−02 |
| A12 = | 2.21073E−03 | −9.20265E−03 | −8.59666E−04 | 5.87983E−02 | 1.28753E−02 |
| A14 = | | 4.46565E−03 | 1.74660E−03 | −9.87907E−03 | −1.75963E−03 |

| Surface # | | | | |
|---|---|---|---|---|
| | 12 | 13 | 14 | 15 |
| k = | −3.39853E+00 | −4.40903E+00 | −2.12503E+00 | −2.00964E+01 |
| A4 = | −1.07531E−01 | −1.45461E−02 | −4.53039E−02 | −2.63996E−02 |
| A6 = | 4.54702E−02 | −1.61418E−02 | 1.65877E−02 | 6.43803E−03 |
| A8 = | −1.84675E−02 | 2.48627E−02 | −8.83767E−04 | −1.44751E−03 |
| A10 = | 2.21076E−03 | −1.18993E−02 | −8.66834E−05 | 1.61180E−04 |
| A12 = | −2.65924E−04 | 2.54456E−03 | −3.82312E−06 | −1.33173E−05 |
| A14 = | 1.12042E−04 | −2.06928E−04 | 1.23641E−06 | 6.78805E−07 |

In the 5th embodiment, the equation of the aspheric surface profiles of the aforementioned lens elements is the same as the equation of the 1st embodiment. Also, the definitions of f, Fno, HFOV, V1, V2, CTmin, R13, R14, f3, f4, f6, f7. SAG52, CT5. Yc72, Td, FOV, TTL and ImgH are the same as those stated in the 1st embodiment with corresponding values for the 5th embodiment, so an explanation in this regard will not be provided again.

Moreover, these parameters can be calculated from Table 9 and Table 10 as the following values and satisfy the following relationships:

| 5th Embodiment | | | |
|---|---|---|---|
| f (mm) | 3.74 | $|f/f6| + |f/f7|$ | 3.31 |
| Fno | 2.10 | f/f7 | −1.83 |
| HFOV (deg.) | 38.7 | SAG52 + CT5 (mm) | −0.05 |
| V1 − V2 | 34.5 | Yc72/f | 0.40 |
| CTmin (mm) | 0.220 | Td/f | 1.15 |
| R14/R13 | −1.50 | FOV (deg.) | 77.4 |
| R14/f | 0.76 | TTL/ImgH | 1.62 |
| $|f/f3| + |f/f4|$ | 0.41 | | |

6th Embodiment

Figure 11:
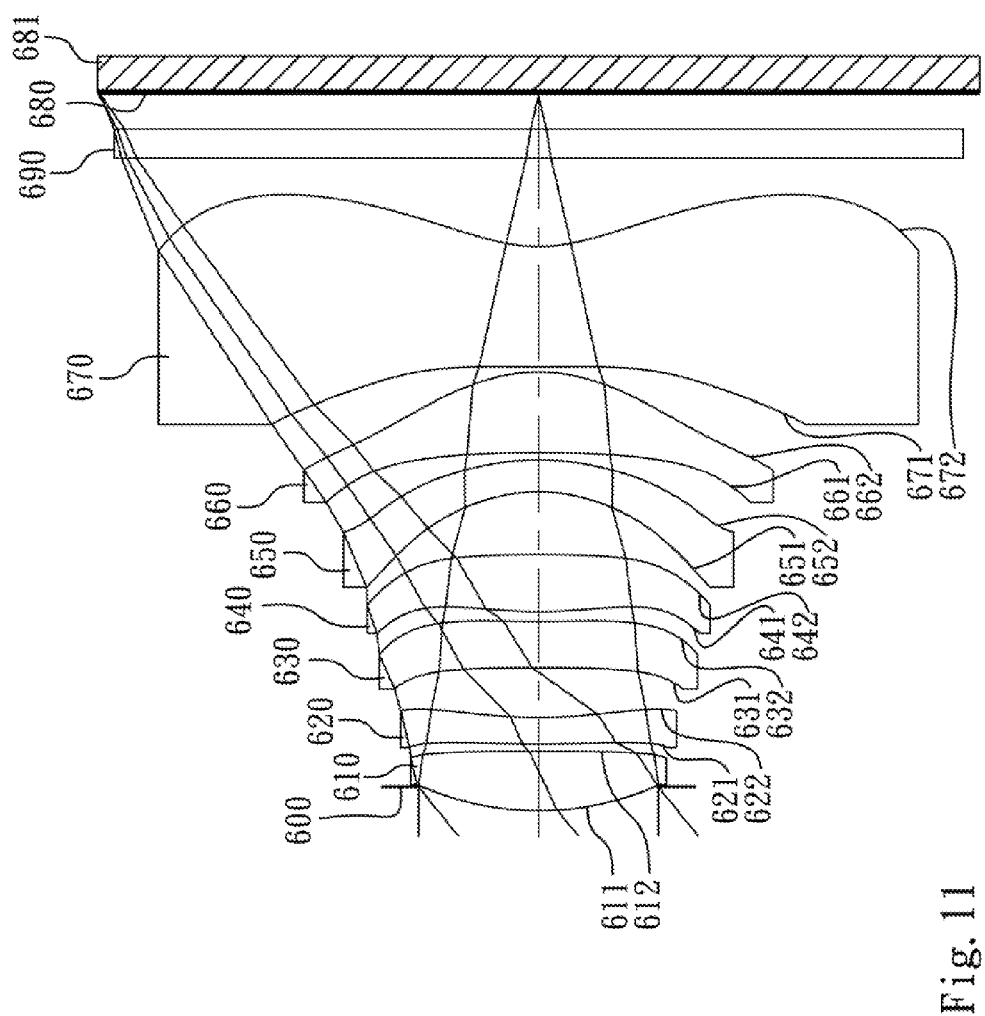
FIG. 11 is a schematic view of an optical image capturing system according to the 6th embodiment of the present disclosure.
Figure 12:
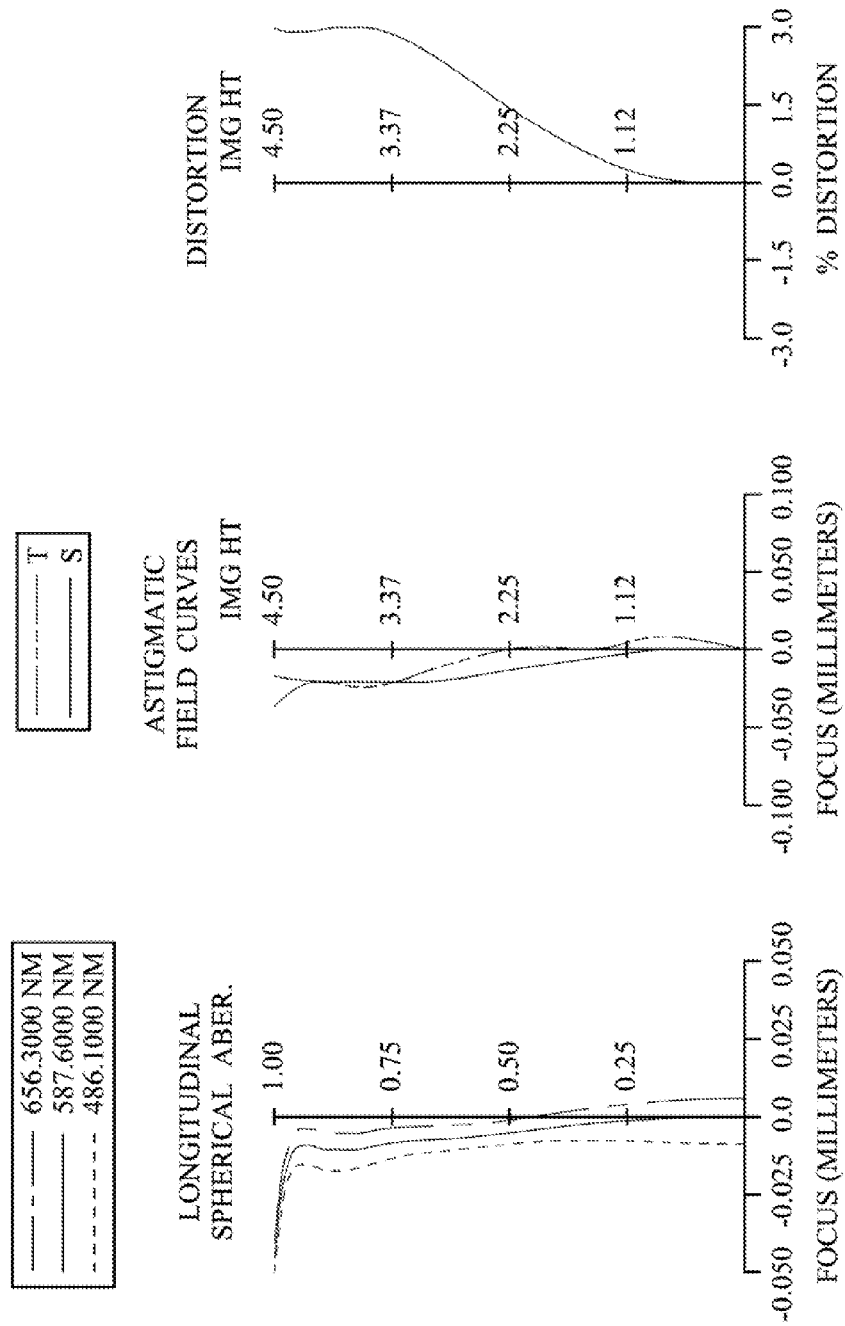
FIG. 12 shows, in order from left to right, spherical aberration curves, astigmatic field curves and a distortion curve of the optical image capturing system according to the 6th embodiment.

FIG. 11 is a schematic view of an optical image capturing system according to the 6th embodiment of the present disclosure. FIG. 12 shows, in order from left to right, spherical aberration curves, astigmatic field curves and a distortion curve of the optical image capturing system according to the 6th embodiment.

In FIG. 11, the optical image capturing system includes, in order from an object side to an image side, an aperture stop 600, a first lens element 610, a second lens element 620, a third lens element 630, a fourth lens element 640, a fifth lens element 650, a sixth lens element 660, a seventh lens element 670, an IR-cut filter 690, an image plane 680 and an image sensor 681.

The first lens element 610 with positive refractive power has a convex object-side surface 611 and a convex image-side surface 612, which are both aspheric, and the first lens element 610 is made of plastic material.

The second lens element 620 with negative refractive power has a convex object-side surface 621 and a concave image-side surface 622, which are both aspheric, and the second lens element 620 is made of plastic material.

The third lens element 630 with negative refractive power has a concave object-side surface 631 and a concave image-side surface 632, which are both aspheric, and the third lens element 630 is made of plastic material.

The fourth lens element 640 with positive refractive power has a convex object-side surface 641 and a convex image-side surface 642, which are both aspheric, and the fourth lens element 640 is made of plastic material. Furthermore, the object-side surface 641 of the fourth lens element 640 includes at least one inflection point.

The fifth lens element 650 with negative refractive power has a concave object-side surface 651 and a convex image-side surface 652, which are both aspheric, and the fifth lens element 650 is made of plastic material.

The sixth lens element 660 with positive refractive power has a concave object-side surface 661 and a convex image-side surface 662 which are both aspheric, and the sixth lens element 660 is made of plastic material.

The seventh lens element 670 with negative refractive power has a convex object-side surface 671 and a concave image-side surface 672 which are both aspheric, and the seventh lens element 670 is made of plastic material. The image-side surface 672 changes from concave at a paraxial region to convex at a peripheral region. Furthermore, the image-side surface 672 of the seventh lens element 670 includes at least one inflection point.

The IR-cut filter 690 is made of glass and located between the seventh lens element 670 and the image plane 680, and will not affect the focal length of the optical image capturing system.

The detailed optical data of the 6th embodiment are shown in Table 11 and the aspheric surface data are shown in Table 12 below.

TABLE 11

6th Embodiment
f = 5.38 mm, Fno = 2.20, HFOV = 39.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.240 | | | | |
| 2 | Lens 1 | 2.999970 (ASP) | 0.606 | Plastic | 1.544 | 55.9 | 5.29 |
| 3 | | −67.612600 (ASP) | 0.072 | | | | |
| 4 | Lens 2 | 8.567900 (ASP) | 0.273 | Plastic | 1.634 | 23.8 | −14.38 |
| 5 | | 4.361700 (ASP) | 0.509 | | | | |
| 6 | Lens 3 | −26.055100 (ASP) | 0.471 | Plastic | 1.544 | 55.9 | −18.30 |
| 7 | | 16.219900 (ASP) | 0.098 | | | | |
| 8 | Lens 4 | 4.863200 (ASP) | 0.586 | Plastic | 1.544 | 55.9 | 6.92 |
| 9 | | −15.971000 (ASP) | 0.637 | | | | |
| 10 | Lens 5 | −1.609130 (ASP) | 0.330 | Plastic | 1.634 | 23.8 | −8.17 |
| 11 | | −2.520100 (ASP) | 0.070 | | | | |
| 12 | Lens 6 | −25.286300 (ASP) | 0.823 | Plastic | 1.535 | 56.3 | 3.27 |
| 13 | | −1.653350 (ASP) | 0.051 | | | | |
| 14 | Lens 7 | 28.203800 (ASP) | 1.235 | Plastic | 1.535 | 56.3 | −3.15 |
| 15 | | 1.564750 (ASP) | 0.900 | | | | |
| 16 | IR-cut filter | Plano | 0.300 | Glass | 1.517 | 64.2 | — |
| 17 | | Plano | 0.376 | | | | |
| 18 | Image | Plano | — | | | | |

Note:
Reference wavelength (d-line) is 587.6 nm.

TABLE 12

Aspheric Coefficients

| | Surface # | | | | |
|---|---|---|---|---|---|
| | 2 | 3 | 4 | 5 | 6 |
| k = | 4.01544E−01 | −5.00000E+01 | −8.42402E+00 | −9.30597E+00 | 3.00000E+00 |
| A4 = | −1.56440E−03 | −3.80636E−02 | −8.19776E−02 | −4.68550E−02 | −1.24630E−02 |
| A6 = | −2.89629E−03 | 4.41253E−02 | 6.66015E−02 | 2.79083E−02 | −7.20040E−03 |
| A8 = | 5.74626E−03 | −2.40812E−02 | −3.05395E−02 | −1.33958E−02 | 6.99479E−04 |
| A10 = | −9.82788E−03 | −1.13343E−03 | 9.24213E−04 | 3.07751E−03 | −1.24872E−03 |
| A12 = | 7.50285E−03 | 7.58909E−03 | 5.01905E−03 | −1.11147E−03 | |
| A14 = | −2.25574E−03 | −3.29879E−03 | −2.22159E−03 | 2.12328E−04 | |

| | Surface # | | | | |
|---|---|---|---|---|---|
| | 7 | 8 | 9 | 10 | 11 |
| k = | −9.69905E+00 | −2.00000E+01 | −3.24011E+00 | −1.08216E+00 | −2.91816E+00 |
| A4 = | −4.82613E−02 | −2.98065E−02 | −6.80002E−03 | 8.05669E−02 | 2.11134E−02 |
| A6 = | 3.37685E−03 | −1.29738E−02 | −2.28135E−02 | −8.91292E−02 | −3.01124E−02 |
| A8 = | −2.79449E−03 | 2.81599E−03 | 3.46632E−03 | 4.20982E−02 | 1.24422E−02 |
| A10 = | −9.37756E−05 | −6.72440E−04 | 2.15464E−07 | −1.47389E−02 | −3.90392E−03 |
| A12 = | | −4.96332E−04 | −1.38855E−04 | 3.81920E−03 | 8.23878E−04 |
| A14 = | | 1.90099E−04 | 4.01335E−05 | −4.44578E−04 | −6.55653E−05 |

| | Surface # | | | |
|---|---|---|---|---|
| | 12 | 13 | 14 | 15 |
| k = | 5.00000E+00 | −3.91428E+00 | −1.00000E+00 | −5.65225E+00 |
| A4 = | −3.12302E−02 | −2.53693E−02 | −4.42218E−02 | −1.83434E−02 |
| A6 = | 1.47040E−02 | 1.66451E−03 | 7.06313E−03 | 2.88292E−03 |
| A8 = | −4.37468E−03 | 4.26941E−03 | −2.47434E−04 | −3.18087E−04 |
| A10 = | 3.12703E−04 | −1.35527E−03 | −2.49118E−05 | 2.05537E−05 |

TABLE 12-continued

| Aspheric Coefficients | | | |
|---|---|---|---|
| A12 = | 1.96691E−05 | 1.57833E−04 | −5.34985E−07 | −7.48457E−07 |
| A14 = | −9.39014E−07 | −6.65177E−06 | 1.89711E−07 | 1.10386E−08 |

In the 6th embodiment, the equation of the aspheric surface profiles of the aforementioned lens elements is the same as the equation of the 1st embodiment. Also, the definitions of f, Fno, HFOV, V1, V2, CTmin, R13, R14, f3, f4, f6, f7, SAG52, CT5, Yc72, Td, FOV, TTL and ImgH are the same as those stated in the 1st embodiment with corresponding values for the 6th embodiment, so an explanation in this regard will not be provided again.

Moreover, these parameters can be calculated from Table 11 and Table 12 as the following values and satisfy the following relationships:

| 6th Embodiment | | | |
|---|---|---|---|
| f (mm) | 5.38 | \|f/f6\| + \|f/f7\| | 3.35 |
| Fno | 2.20 | f/f7 | −1.71 |
| HFOV (deg.) | 39.1 | SAG52 + CT5 (mm) | −0.41 |
| V1 − V2 | 32.1 | Yc72/f | 0.48 |
| CTmin (mm) | 0.273 | Td/f | 1.07 |
| R14/R13 | 0.06 | FOV (deg.) | 78.2 |
| R14/f | 0.29 | TTL/ImgH | 1.61 |
| \|f/f3\| + \|f/f4\| | 1.07 | | |

7th Embodiment

Figure 13:
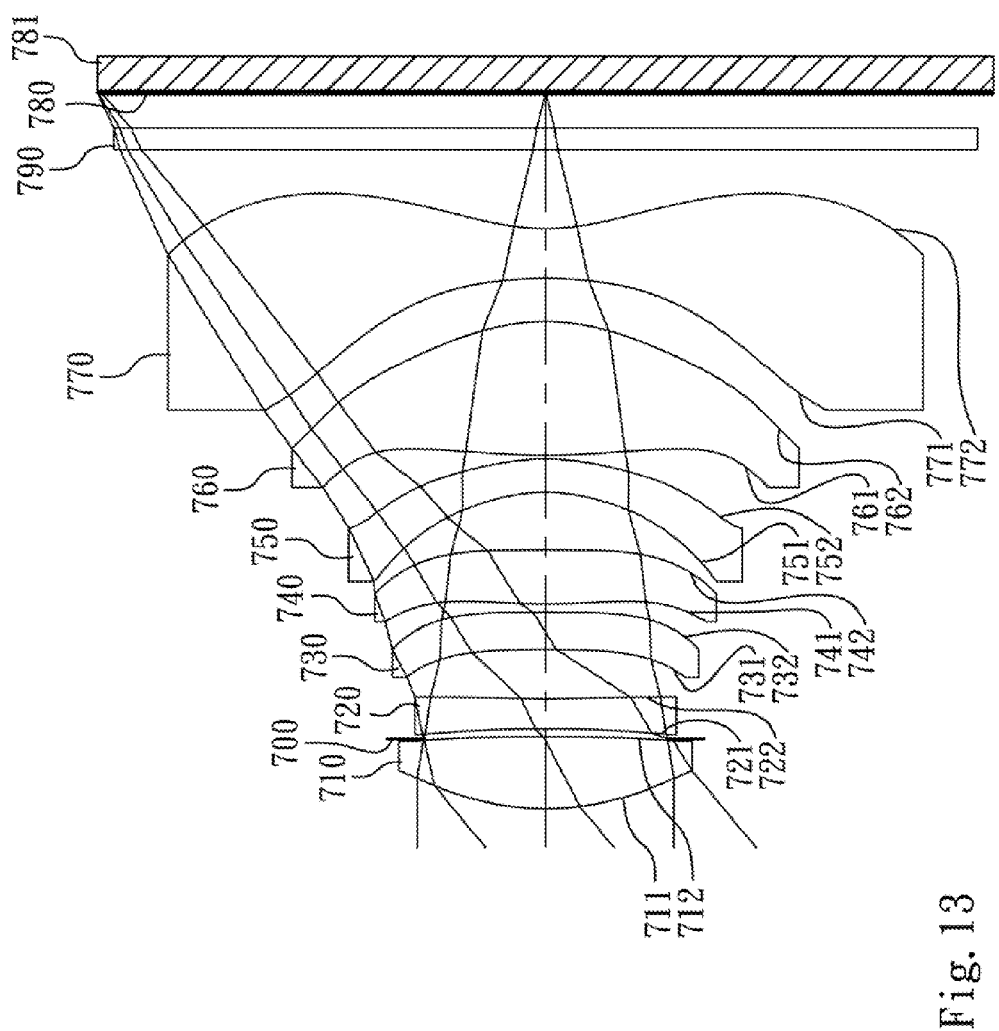
FIG. 13 is a schematic view of an optical image capturing system according to the 7th embodiment of the present disclosure.
Figure 14:
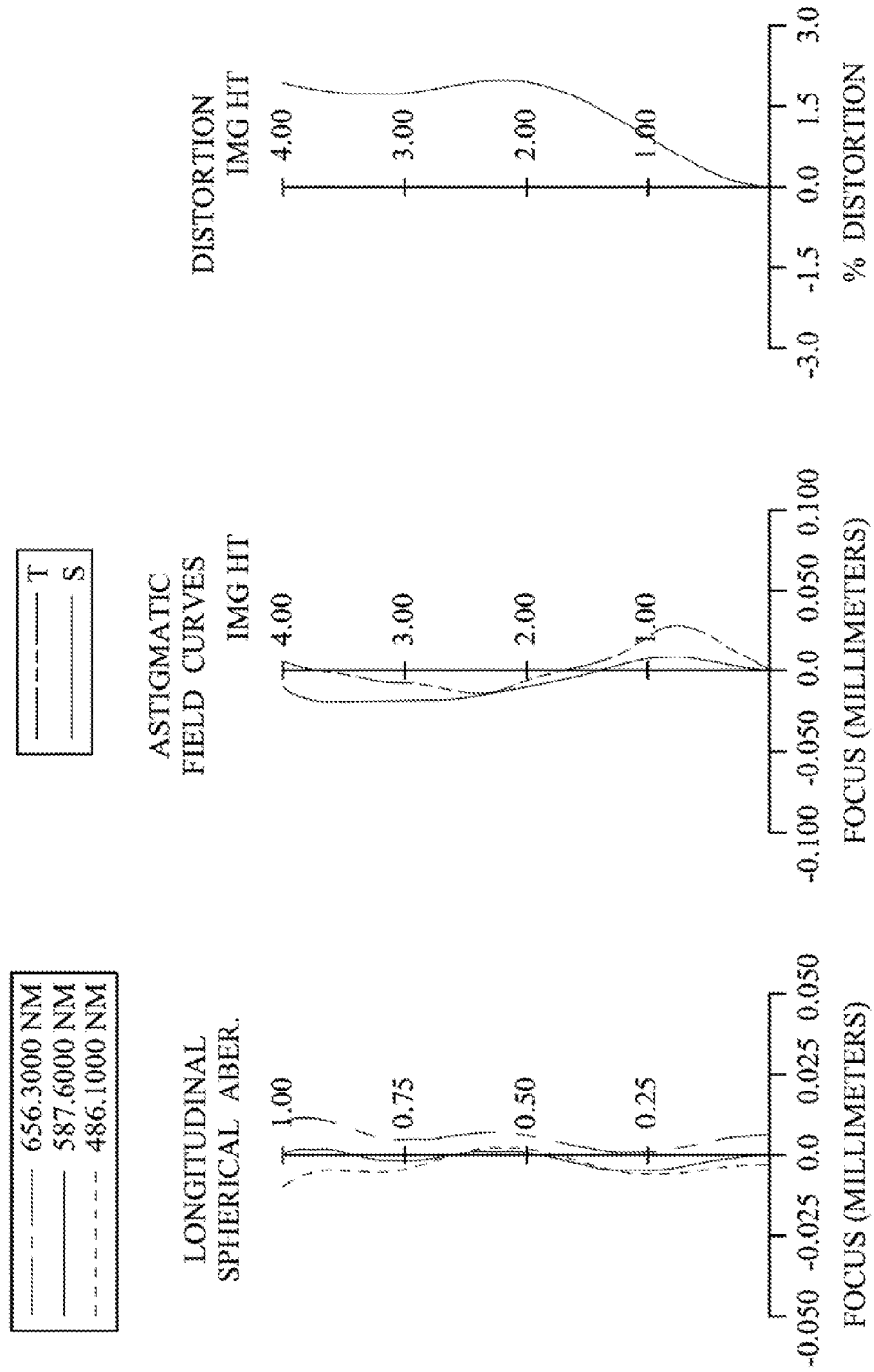
FIG. 14 shows, in order from left to right, spherical aberration curves, astigmatic field curves and a distortion curve of the optical image capturing system according to the 7th embodiment.

FIG. 13 is a schematic view of an optical image capturing system according to the 7th embodiment of the present disclosure. FIG. 14 shows, in order from left to right, spherical aberration curves, astigmatic field curves and a distortion curve of the optical image capturing system according to the 7th embodiment.

In FIG. 13, the optical image capturing system includes, in order from an object side to an image side, a first lens element 710, an aperture stop 700, a second lens element 720, a third lens element 730, a fourth lens element 740, a fifth lens element 750, a sixth lens element 760, a seventh lens element 770, an IR-cut filter 790, an image plane 780 and an image sensor 781.

The first lens element 710 with positive refractive power has a convex object-side surface 711 and a convex image-side surface 712, which are both aspheric, and the first lens element 710 is made of plastic material.

The second lens element 720 with negative refractive power has a concave object-side surface 721 and a concave image-side surface 722, which are both aspheric, and the second lens element 720 is made of plastic material.

The third lens element 730 with negative refractive power has a concave object-side surface 731 and a convex image-side surface 732, which are both aspheric, and the third lens element 730 is made of plastic material.

The fourth lens element 740 with positive refractive power has a convex object-side surface 741 and a convex image-side surface 742, which are both aspheric, and the fourth lens element 740 is made of plastic material. Furthermore, the object-side surface 741 of the fourth lens element 740 includes at least one inflection point.

The fifth lens element 750 with negative refractive power has a concave object-side surface 751 and a convex image-side surface 752, which are both aspheric, and the fifth lens element 750 is made of plastic material.

The sixth lens element 760 with positive refractive power has a convex object-side surface 761 and a convex image-side surface 762 which are both aspheric, and the object-side surface 761 changes from convex at a paraxial region to concave at a peripheral region. The sixth lens element 760 is made of plastic material.

The seventh lens element 770 with negative refractive power has a concave object-side surface 771 and a concave image-side surface 772 which are both aspheric, and the seventh lens element 770 is made of plastic material. The image-side surface 772 changes from concave at a paraxial region to convex at a peripheral region. Furthermore, the image-side surface 772 of the seventh lens element 770 includes at least one inflection point.

The IR-cut filter 790 is made of glass and located between the seventh lens element 770 and the image plane 780, and will not affect the focal length of the optical image capturing system.

The detailed optical data of the 7th embodiment are shown in Table 13 and the aspheric surface data are shown in Table 14 below.

TABLE 13

7th Embodiment
f = 4.70 mm, Fno = 2.05, HFOV = 39.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.552000 (ASP) | 0.644 | Plastic | 1.544 | 55.9 | 4.51 |
| 2 | | −59.234700 (ASP) | −0.019 | | | | |
| 3 | Ape. Stop | Plano | 0.087 | | | | |
| 4 | Lens 2 | −36.697200 (ASP) | 0.271 | Plastic | 1.650 | 21.4 | −13.48 |
| 5 | | 11.539200 (ASP) | 0.443 | | | | |
| 6 | Lens 3 | −9.405600 (ASP) | 0.326 | Plastic | 1.544 | 55.9 | −20.22 |
| 7 | | −65.634000 (ASP) | 0.074 | | | | |
| 8 | Lens 4 | 5.508100 (ASP) | 0.488 | Plastic | 1.544 | 55.9 | 8.43 |
| 9 | | −26.548500 (ASP) | 0.512 | | | | |
| 10 | Lens 5 | −1.455840 (ASP) | 0.300 | Plastic | 1.650 | 21.4 | −9.21 |
| 11 | | −2.080300 (ASP) | 0.035 | | | | |

TABLE 13-continued

7th Embodiment
f = 4.70 mm, Fno = 2.05, HFOV = 39.9 deg.

| Surface # | | Curvature Radius | Thickness | Material | Index | Abbe # | Focal length |
|---|---|---|---|---|---|---|---|
| 12 | Lens 6 | 5.526900 (ASP) | 1.196 | Plastic | 1.544 | 55.9 | 2.63 |
| 13 | | −1.781640 (ASP) | 0.381 | | | | |
| 14 | Lens 7 | −3.779400 (ASP) | 0.450 | Plastic | 1.530 | 55.8 | −2.29 |
| 15 | | 1.864430 (ASP) | 0.700 | | | | |
| 16 | IR-cut filter | Plano | 0.200 | Glass | 1.517 | 64.2 | — |
| 17 | | Plano | 0.316 | | | | |
| 18 | Image | Plano | — | | | | |

Note:
Reference wavelength (d-line) is 587.6 nm.

TABLE 14

Aspheric Coefficients

| Surface # | | | | | |
|---|---|---|---|---|---|
| | 1 | 2 | 4 | 5 | 6 |
| k = | 1.24996E+00 | −5.00000E+01 | −5.00000E+01 | −5.00000E+01 | −1.47280E+01 |
| A4 = | −6.55257E−03 | −5.28204E−02 | −8.73850E−02 | −5.59195E−02 | −4.28602E−02 |
| A6 = | −1.77310E−02 | 7.30552E−02 | 1.14595E−01 | 5.56109E−02 | −1.89061E−02 |
| A8 = | 3.02431E−02 | −4.28443E−02 | −6.87772E−02 | −3.99650E−02 | 6.43553E−03 |
| A10 = | −3.30032E−02 | −2.94210E−03 | 4.82093E−03 | 1.66795E−02 | −4.33981E−03 |
| A12 = | 1.72237E−02 | 1.22346E−02 | 1.37324E−02 | −3.82242E−03 | −5.02596E−05 |
| A14 = | −4.03478E−03 | −3.93520E−03 | −4.15965E−03 | 1.09866E−03 | −4.36603E−09 |

| Surface # | | | | | |
|---|---|---|---|---|---|
| | 7 | 8 | 9 | 10 | 11 |
| k = | −5.00000E+01 | −5.00000E+01 | 3.00000E+00 | −2.11829E+00 | −7.16778E+00 |
| A4 = | −8.75294E−02 | −5.93688E−02 | −3.06406E−02 | 1.22411E−01 | 2.60299E−02 |
| A6 = | 1.95170E−02 | −8.93391E−03 | −3.18133E−02 | −1.71303E−01 | −5.34072E−02 |
| A8 = | −1.44992E−02 | 5.53314E−03 | 7.75816E−03 | 9.38898E−02 | 2.73223E−02 |
| A10 = | 2.16819E−03 | −1.19246E−03 | 1.04262E−03 | −4.15955E−02 | −1.11730E−02 |
| A12 = | 4.65110E−04 | −1.16400E−03 | −4.08272E−04 | 1.36852E−02 | 2.93311E−03 |
| A14 = | −4.14156E−04 | 5.27523E−04 | −4.78330E−05 | −1.99216E−03 | −2.75785E−04 |

| Surface # | | | | |
|---|---|---|---|---|
| | 12 | 13 | 14 | 15 |
| k = | 2.13050E+00 | −4.68712E+00 | −1.92871E+01 | −7.18320E+00 |
| A4 = | −5.78245E−02 | −1.04836E−02 | −5.71189E−02 | −2.59797E−02 |
| A6 = | 2.40501E−02 | −7.74761E−03 | 6.98751E−03 | 4.42064E−03 |
| A8 = | −7.84867E−03 | 9.20324E−03 | −1.87842E−04 | −5.99594E−04 |
| A10 = | 5.33907E−04 | −3.68429E−03 | 5.07686E−06 | 5.25450E−05 |
| A12 = | −1.75044E−05 | 5.84664E−04 | 1.90670E−06 | −2.78886E−06 |
| A14 = | 1.26961E−05 | −3.16505E−05 | −2.77147E−07 | 6.51816E−08 |

In the 7th embodiment, the equation of the aspheric surface profiles of the aforementioned lens elements is the same as the equation of the 1st embodiment. Also, the definitions of f, Fno, HFOV, V1, V2, CTmin, R13, R14, f3, f4, f6, f7, SAG52, CT5, Yc72, Td, FOV, TTL and ImgH are the same as those stated in the 1st embodiment with corresponding values for the 6th embodiment, so an explanation in this regard will not be provided again.

Moreover, these parameters can be calculated from Table 13 and Table 14 as the following values and satisfy the following relationships:

| 7th Embodiment | | | |
|---|---|---|---|
| f (mm) | 4.70 | |f/f6| + |f/f7| | 3.84 |
| Fno | 2.05 | f/f7 | −2.05 |
| HFOV (deg.) | 39.9 | SAG52 + CT5 (mm) | −0.32 |
| V1 − V2 | 34.5 | Yc72/f | 0.42 |
| CTmin (mm) | 0.271 | Td/f | 1.10 |
| R14/R13 | −0.49 | FOV (deg.) | 79.8 |
| R14/f | 0.40 | TTL/ImgH | 1.58 |
| |f/f3| + |f/f4| | 0.79 | | |

8th Embodiment

Figure 15:
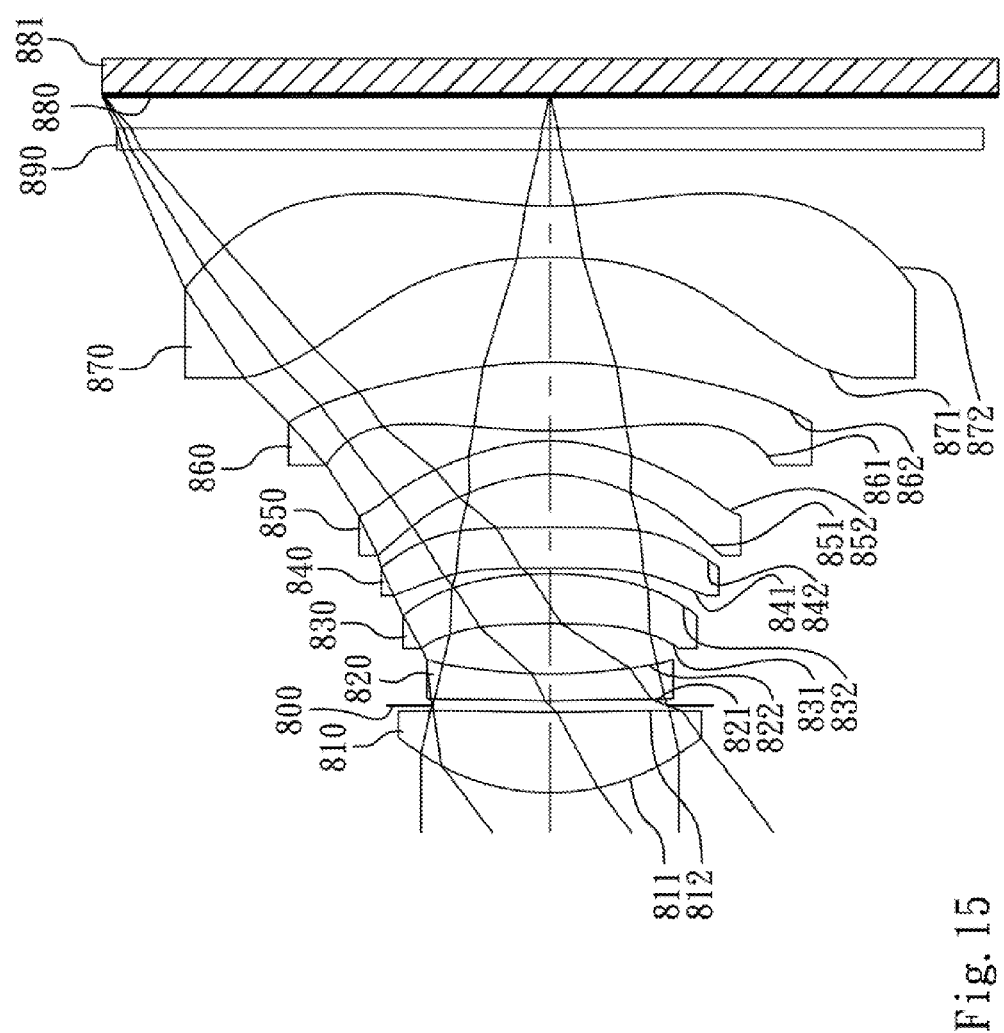
FIG. 15 is a schematic view of an optical image capturing system according to the 8th embodiment of the present disclosure.
Figure 16:
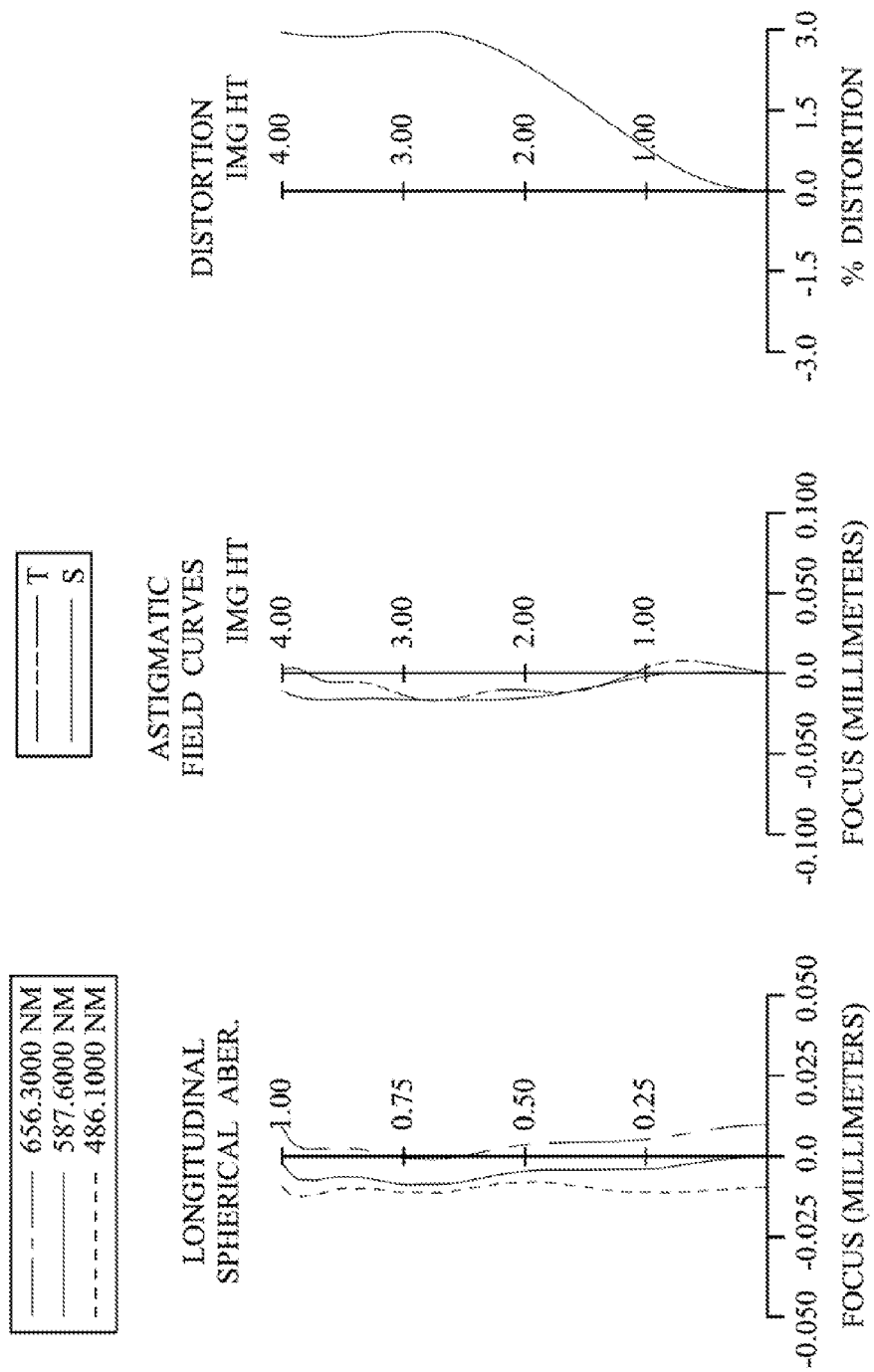
FIG. 16 shows, in order from left to right, spherical aberration curves, astigmatic field curves and a distortion curve of the optical image capturing system according to the 8th embodiment.

FIG. 15 is a schematic view of an optical image capturing system according to the 8th embodiment of the present disclosure. FIG. 16 shows, in order from left to right, spherical aberration curves, astigmatic field curves and a distortion curve of the optical image capturing system according to the 8th embodiment.

In FIG. 15, the optical image capturing system includes, in order from an object side to an image side, a first lens element 810, an aperture stop 800, a second lens element 820, a third lens element 830, a fourth lens element 840, a fifth lens element 850, a sixth lens element 860, a seventh lens element 870, an IR-cut filter 890, an image plane 880 and an image sensor 881.

The first lens element 810 with positive refractive power has a convex object-side surface 811 and a concave image-side surface 812, which are both aspheric, and the first lens element 810 is made of plastic material.

The second lens element 820 with negative refractive power has a convex object-side surface 821 and a concave image-side surface 822, which are both aspheric, and the second lens element 820 is made of plastic material.

The third lens element 830 with positive refractive power has a concave object-side surface 831 and a convex image-side surface 832, which are both aspheric, and the third lens element 830 is made of plastic material.

The fourth lens element 840 with positive refractive power has a concave object-side surface 841 and a convex image-side surface 842, which are both aspheric, and the fourth lens element 840 is made of plastic material. Furthermore, the object-side surface 841 of the fourth lens element 840 includes at least one inflection point.

The fifth lens element 850 with negative refractive power has a concave object-side surface 851 and a convex image-side surface 852, which are both aspheric, and the fifth lens element 850 is made of plastic material.

The sixth lens element 860 with positive refractive power has a convex object-side surface 861 and a convex image-side surface 862 which are both aspheric, and the sixth lens element 860 is made of plastic material. The object-side surface 861 changes from convex at a paraxial region to concave at a peripheral region.

The seventh lens element 870 with negative refractive power has a concave object-side surface 871 and a concave image-side surface 872 which are both aspheric, and the seventh lens element 870 is made of plastic material. The image-side surface 872 changes from concave at a paraxial region to convex at a peripheral region. Furthermore, the image-side surface 872 of the seventh lens element 870 comprises at least one inflection point.

The IR-cut filter 890 is made of glass and located between the seventh lens element 870 and the image plane 880, and will not affect the focal length of the optical image capturing system.

The detailed optical data of the 8th embodiment are shown in Table 15 and the aspheric surface data are shown in Table 16 below.

TABLE 15

8th Embodiment
f = 5.08 mm, Fno = 2.20, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.106050 (ASP) | 0.727 | Plastic | 1.530 | 55.8 | 4.48 |
| 2 | | 16.377300 (ASP) | 0.058 | | | | |
| 3 | Ape. Stop | Plano | 0.042 | | | | |
| 4 | Lens 2 | 9.396400 (ASP) | 0.240 | Plastic | 1.650 | 21.4 | −11.76 |
| 5 | | 4.171200 (ASP) | 0.447 | | | | |
| 6 | Lens 3 | −6.904700 (ASP) | 0.449 | Plastic | 1.530 | 55.8 | 14.72 |
| 7 | | −3.745600 (ASP) | 0.050 | | | | |
| 8 | Lens 4 | −237.531700 (ASP) | 0.364 | Plastic | 1.530 | 55.8 | 279.46 |
| 9 | | −91.271700 (ASP) | 0.476 | | | | |
| 10 | Lens 5 | −1.264930 (ASP) | 0.300 | Plastic | 1.650 | 21.4 | −10.79 |
| 11 | | −1.687700 (ASP) | 0.090 | | | | |
| 12 | Lens 6 | 4.716500 (ASP) | 0.612 | Plastic | 1.530 | 55.8 | 4.50 |
| 13 | | −4.604000 (ASP) | 0.936 | | | | |
| 14 | Lens 7 | −4.091400 (ASP) | 0.460 | Plastic | 1.530 | 55.8 | −3.60 |
| 15 | | 3.720800 (ASP) | 0.500 | | | | |
| 16 | IR-cut filter | Plano | 0.200 | Glass | 1.517 | 64.2 | — |
| 17 | | Plano | 0.294 | | | | |
| 18 | Image | Plano | — | | | | |

Note:
Reference wavelength (d-line) is 587.6 nm.

TABLE 16

Aspheric Coefficients

| | Surface # | | | | |
|---|---|---|---|---|---|
| | 1 | 2 | 4 | 5 | 6 |
| k = | 8.90178E−01 | −3.61096E−01 | −3.83218E+01 | −9.14738E+00 | −1.98164E+01 |
| A4 = | −4.95272E−03 | −4.57358E−02 | −9.83371E−02 | −5.31829E−02 | −3.94999E−02 |
| A6 = | −1.44552E−02 | 5.29770E−02 | 1.11966E−01 | 6.97942E−02 | −1.95451E−02 |
| A8 = | 2.49942E−02 | −3.15473E−02 | −6.31640E−02 | −3.75623E−02 | 3.72584E−04 |
| A10 = | −2.93336E−02 | 2.41746E−03 | 7.64209E−03 | 1.03095E−02 | −8.46446E−03 |
| A12 = | 1.61703E−02 | 4.39750E−03 | 1.24249E−02 | 5.48284E−04 | 2.58665E−03 |
| A14 = | −4.07081E−03 | −1.46693E−03 | −4.15965E−03 | 1.09866E−03 | −1.17926E−08 |

TABLE 16-continued

Aspheric Coefficients

| Surface # | | | | |
|---|---|---|---|---|
| 7 | 8 | 9 | 10 | 11 |
| k = −2.56555E+00 | 3.00000E+00 | −1.03183E+00 | −1.76852E+00 | −3.42595E+00 |
| A4 = −6.18956E−02 | −1.04186E−01 | −5.10015E−02 | 1.55550E−01 | 3.32805E−02 |
| A6 = 1.87497E−02 | 4.15342E−03 | −2.98507E−02 | −1.66325E−01 | −5.00058E−02 |
| A8 = −1.53337E−02 | 8.38758E−03 | 9.54388E−03 | 9.12039E−02 | 2.70150E−02 |
| A10 = 2.17052E−03 | 8.77193E−04 | 1.30623E−03 | −4.24285E−02 | −1.14852E−02 |
| A12 = 1.95878E−03 | −4.85466E−04 | −4.86555E−04 | 1.37199E−02 | 2.89303E−03 |
| A14 = −4.05129E−04 | 1.22823E−05 | 8.10409E−06 | −1.81567E−03 | −2.38389E−04 |

| Surface # | | | |
|---|---|---|---|
| 12 | 13 | 14 | 15 |
| k = −6.58821E+00 | −1.61451E+01 | −2.62115E+00 | −2.11643E+01 |
| A4 = −6.25392E−02 | −8.14410E−03 | −4.42315E−02 | −2.19259E−02 |
| A6 = 2.57139E−02 | −7.65552E−03 | 7.71517E−03 | 3.60828E−03 |
| A8 = −7.55747E−03 | 9.57982E−03 | −2.57484E−04 | −5.48595E−04 |
| A10 = 9.90623E−04 | −3.64717E−03 | −1.43974E−05 | 5.09581E−05 |
| A12 = −1.45805E−04 | 5.80279E−04 | 7.50606E−07 | −3.19315E−06 |
| A14 = 1.30850E−05 | −3.36611E−05 | −2.46540E−08 | 1.00041E−07 |

In the 8th embodiment, the equation of the aspheric surface profiles of the aforementioned lens elements is the same as the equation of the 1st embodiment. Also, the definitions of f, Fno, HFOV, V1, V2, CTmin, R13, R14, f3, f4, f6, f7, SAG52, CT5, Yc72, Td, FOV, TTL and ImgH are the same as those stated in the 1st embodiment with corresponding values for the 8th embodiment, so an explanation in this regard will not be provided again.

Moreover, these parameters can be calculated from Table 15 and Table 16 as the following values and satisfy the following relationships:

| 8th Embodiment | | | |
|---|---|---|---|
| f (mm) | 5.08 | |f/f6| + |f/f7| | 2.54 |
| Fno | 2.20 | f/f7 | −1.41 |
| HFOV (deg.) | 37.5 | SAG52 + CT5 (mm) | −0.38 |
| V1 − V2 | 34.4 | Yc72/f | 0.30 |
| CTmin (mm) | 0.240 | Td/f | 1.03 |
| R14/R13 | −0.91 | FOV (deg.) | 75.0 |
| R14/f | 0.73 | TTL/ImgH | 1.54 |
| |f/f3| + |f/f4| | 0.36 | | |

9th Embodiment

Figure 17:
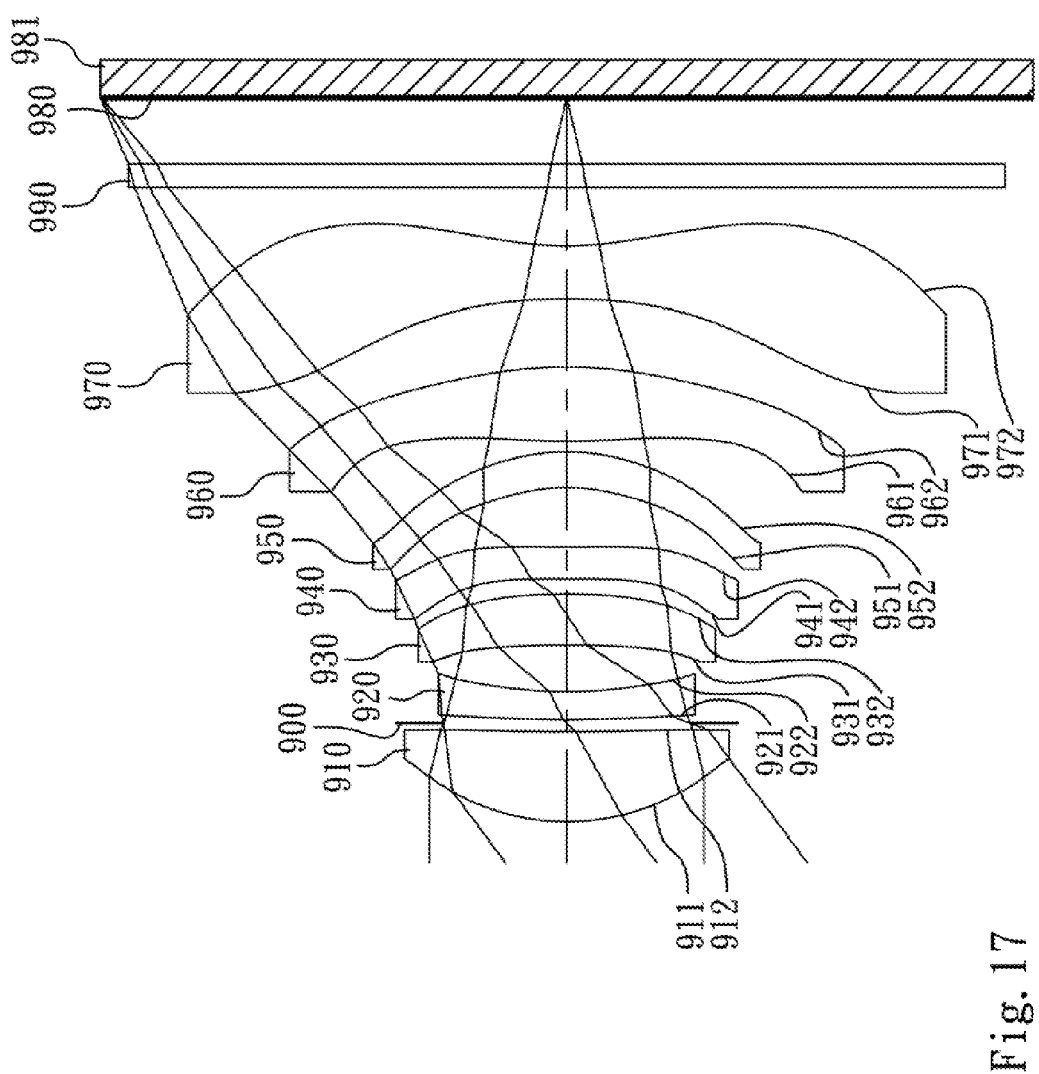
FIG. 17 is a schematic view of an optical image capturing system according to the 9th embodiment of the present disclosure.
Figure 18:
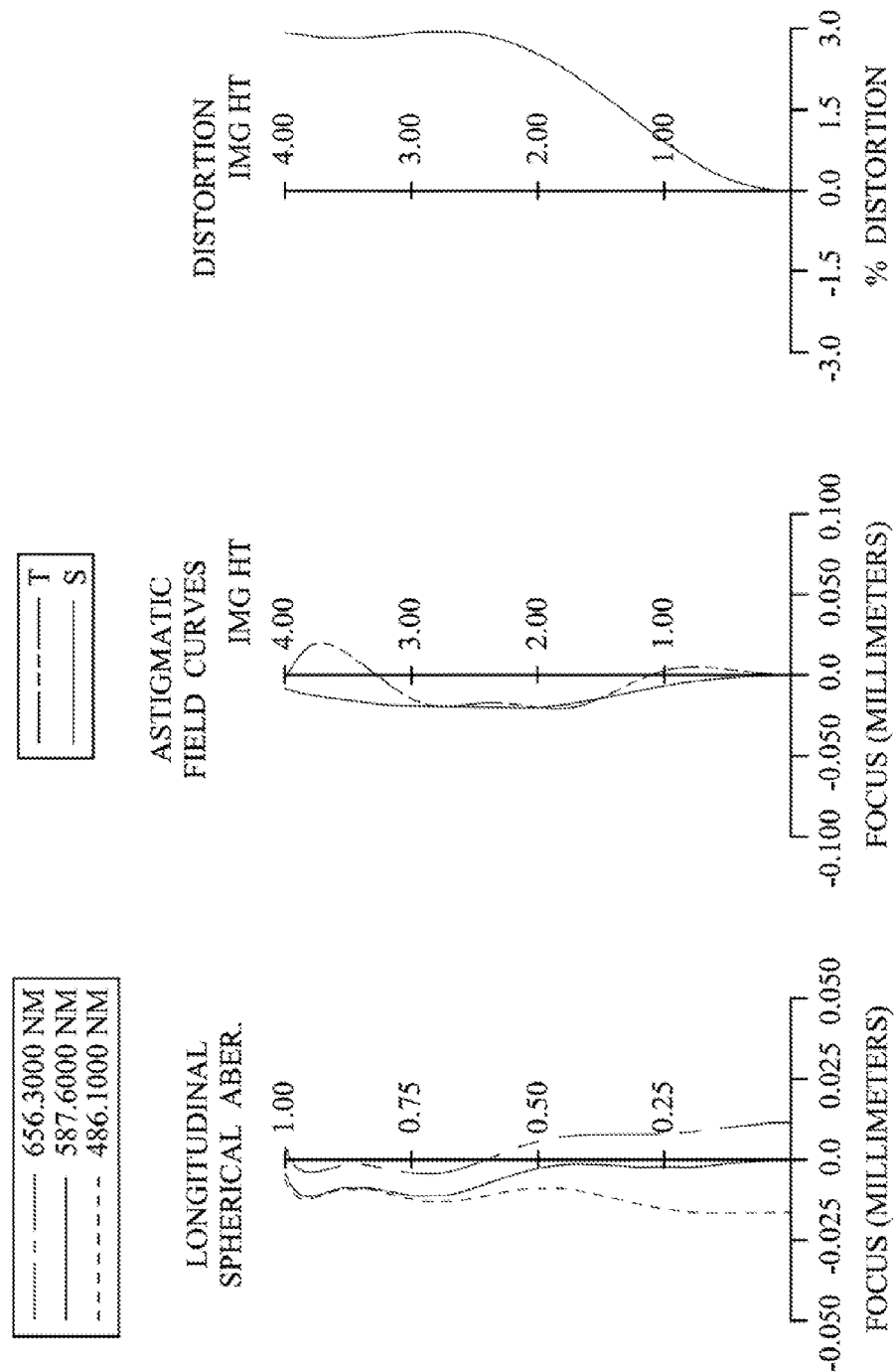
FIG. 18 shows, in order from left to right, spherical aberration curves, astigmatic field curves and a distortion curve of the optical image capturing system according to the 9th embodiment.

FIG. 17 is a schematic view of an optical image capturing system according to the 9th embodiment of the present disclosure. FIG. 18 shows, in order from left to right, spherical aberration curves, astigmatic field curves and a distortion curve of the optical image capturing system according to the 9th embodiment.

In FIG. 17, the optical image capturing system includes, in order from an object side to an image side, a first lens element 910, an aperture stop 900, a second lens element 920, a third lens element 930, a fourth lens element 940, a fifth lens element 950, a sixth lens element 960, a seventh lens element 970, an IR-cut filter 990, an image plane 980 and an image sensor 981.

The first lens element 910 with positive refractive power has a convex object-side surface 911 and a concave image-side surface 912, which are both aspheric, and the first lens element 910 is made of plastic material.

The second lens element 920 with negative refractive power has a convex object-side surface 921 and a concave image-side surface 922, which are both aspheric, and the second lens element 920 is made of plastic material.

The third lens element 930 with positive refractive power has a concave object-side surface 931 and a convex image-side surface 932, which are both aspheric, and the third lens element 930 is made of plastic material.

The fourth lens element 940 with negative refractive power has a concave object-side surface 941 and a concave image-side surface 942, which are both aspheric, and the fourth lens element 940 is made of plastic material. Furthermore, the fourth lens element 940 includes at least one inflection point.

The fifth lens element 950 with negative refractive power has a concave object-side surface 951 and a convex image-side surface 952, which are both aspheric, and the fifth lens element 950 is made of plastic material.

The sixth lens element 960 with positive refractive power has a convex object-side surface 961 and a convex image-side surface 962 which are both aspheric, and the sixth lens element 960 is made of plastic material. The object-side surface 961 changes from convex at a paraxial region to concave at a peripheral region.

The seventh lens element 970 with negative refractive power has a concave object-side surface 971 and a concave image-side surface 972 which are both aspheric, and the seventh lens element 970 is made of plastic material. The image-side surface 972 changes from concave at a paraxial region to convex at a peripheral region. Furthermore, the image-side surface 972 of the seventh lens element 970 includes at least one inflection point.

The IR-cut filter 990 is made of glass and located between the seventh lens element 970 and the image plane 980, and will not affect the focal length of the optical image capturing system.

The detailed optical data of the 9th embodiment are shown in Table 17 and the aspheric surface data are shown in Table 18 below.

TABLE 17

9th Embodiment
f = 5.19 mm, Fno = 2.20, HFOV = 36.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.016660 (ASP) | 0.778 | Plastic | 1.530 | 55.8 | 4.30 |
| 2 | | 15.131600 (ASP) | 0.073 | | | | |
| 3 | Ape. Stop | Plano | 0.030 | | | | |
| 4 | Lens 2 | 6.870700 (ASP) | 0.240 | Plastic | 1.650 | 21.4 | −10.88 |
| 5 | | 3.436500 (ASP) | 0.396 | | | | |
| 6 | Lens 3 | −11.287400 (ASP) | 0.443 | Plastic | 1.530 | 55.8 | 18.44 |
| 7 | | −5.309200 (ASP) | 0.131 | | | | |
| 8 | Lens 4 | −75.949000 (ASP) | 0.275 | Plastic | 1.614 | 25.6 | −28.98 |
| 9 | | 23.276000 (ASP) | 0.512 | | | | |
| 10 | Lens 5 | −1.507460 (ASP) | 0.306 | Plastic | 1.583 | 30.2 | −30.36 |
| 11 | | −1.770930 (ASP) | 0.090 | | | | |
| 12 | Lens 6 | 5.383000 (ASP) | 0.640 | Plastic | 1.530 | 55.8 | 4.20 |
| 13 | | −3.638100 (ASP) | 0.580 | | | | |
| 14 | Lens 7 | −5.525900 (ASP) | 0.460 | Plastic | 1.514 | 56.8 | −3.47 |
| 15 | | 2.704660 (ASP) | 0.500 | | | | |
| 16 | IR-cut filter | Plano | 0.200 | Glass | 1.517 | 64.2 | — |
| 17 | | Plano | 0.574 | | | | |
| 18 | Image | Plano | — | | | | |

Note:
Reference wavelength (d-line) is 587.6 nm.

TABLE 18

Aspheric Coefficients

| | Surface # | | | | |
|---|---|---|---|---|---|
| | 1 | 2 | 4 | 5 | 6 |
| k = | 7.06581E−01 | 1.43308E+00 | −1.70988E+01 | −6.76507E+00 | −5.00000E+01 |
| A4 = | −5.20571E−03 | −4.45093E−02 | −9.83870E−02 | −5.12300E−02 | −2.97615E−02 |
| A6 = | −1.43494E−02 | 5.06872E−02 | 1.09598E−01 | 6.89375E−02 | −1.00827E−02 |
| A8 = | 2.44478E−02 | −2.98149E−02 | −5.98233E−02 | −3.70644E−02 | −4.95992E−04 |
| A10 = | −2.85733E−02 | 4.01557E−03 | 7.18376E−03 | 1.10013E−02 | −1.06053E−02 |
| A12 = | 1.53650E−02 | 2.22862E−03 | 1.16900E−02 | 6.95250E−04 | 5.81239E−03 |
| A14 = | −3.67572E−03 | −7.58506E−04 | −4.15965E−03 | 1.09866E−03 | −1.37340E−08 |

| | Surface # | | | | |
|---|---|---|---|---|---|
| | 7 | 8 | 9 | 10 | 11 |
| k = | −3.60203E+00 | 3.00000E+00 | 6.00756E−01 | −1.33044E+00 | −1.94664E+00 |
| A4 = | −5.98240E−02 | −1.39760E−01 | −7.64183E−02 | 1.60132E−01 | 1.88715E−02 |
| A6 = | 1.66271E−02 | −5.04354E−03 | −2.27892E−02 | −1.65334E−01 | −4.82161E−02 |
| A8 = | −1.72316E−02 | 7.79298E−03 | 1.09834E−02 | 8.79958E−02 | 2.72834E−02 |
| A10 = | 1.09129E−03 | 1.30186E−03 | 8.03602E−03 | −4.25563E−02 | −1.16685E−02 |
| A12 = | 2.17693E−03 | −2.58667E−04 | −4.59790E−04 | 1.38851E−02 | 2.87178E−03 |
| A14 = | −2.13849E−04 | 3.54222E−04 | 1.04242E−04 | −1.79214E−03 | −1.95884E−04 |

| | Surface # | | | |
|---|---|---|---|---|
| | 12 | 13 | 14 | 15 |
| k = | −3.16527E+01 | −1.32837E+01 | −2.00000E+01 | −1.02392E+01 |
| A4 = | −7.21293E−02 | −7.69920E−03 | −4.22026E−02 | −2.47789E−02 |
| A6 = | 2.94689E−02 | −8.05827E−03 | 7.35719E−03 | 3.72634E−03 |
| A8 = | −7.19999E−03 | 9.55590E−03 | −2.91687E−04 | −5.55536E−04 |
| A10 = | 8.26684E−04 | −3.64828E−03 | −1.57467E−05 | 5.20424E−05 |
| A12 = | −1.98203E−04 | 5.79269E−04 | 8.72367E−07 | −3.10945E−06 |
| A14 = | 2.72684E−05 | −3.34003E−05 | 1.39566E−08 | 9.28903E−08 |

In the 9th embodiment, the equation of the aspheric surface profiles of the aforementioned lens elements is the same as the equation of the 1st embodiment. Also, the definitions of f, Fno, HFOV, V1, V2, CTmin, R13, R14, f3, f4, f6, f7, SAG52, CT5. Yc72, Td, FOV, TTL and ImgH are the same as those stated in the 1st embodiment with corresponding values for the 9th embodiment, so an explanation in this regard will not be provided again.

Moreover, these parameters can be calculated from Table 17 and Table 18 as the following values and satisfy the following relationships:

| 9th Embodiment | | | |
|---|---|---|---|
| f (mm) | 5.19 | \|f/f6\| + \|f/f7\| | 2.73 |
| Fno | 2.20 | f/f7 | −1.50 |
| HFOV (deg.) | 36.9 | SAG52 + CT5 (mm) | −0.48 |
| V1 − V2 | 34.4 | Yc72/f | 0.32 |
| CTmin (mm) | 0.240 | Td/f | 0.95 |
| R14/R13 | −0.49 | FOV (deg.) | 73.8 |
| R14/f | 0.52 | TTL/ImgH | 1.54 |
| \|f/f3\| + \|f/f4\| | 0.46 | | |

10th Embodiment

Figure 19:
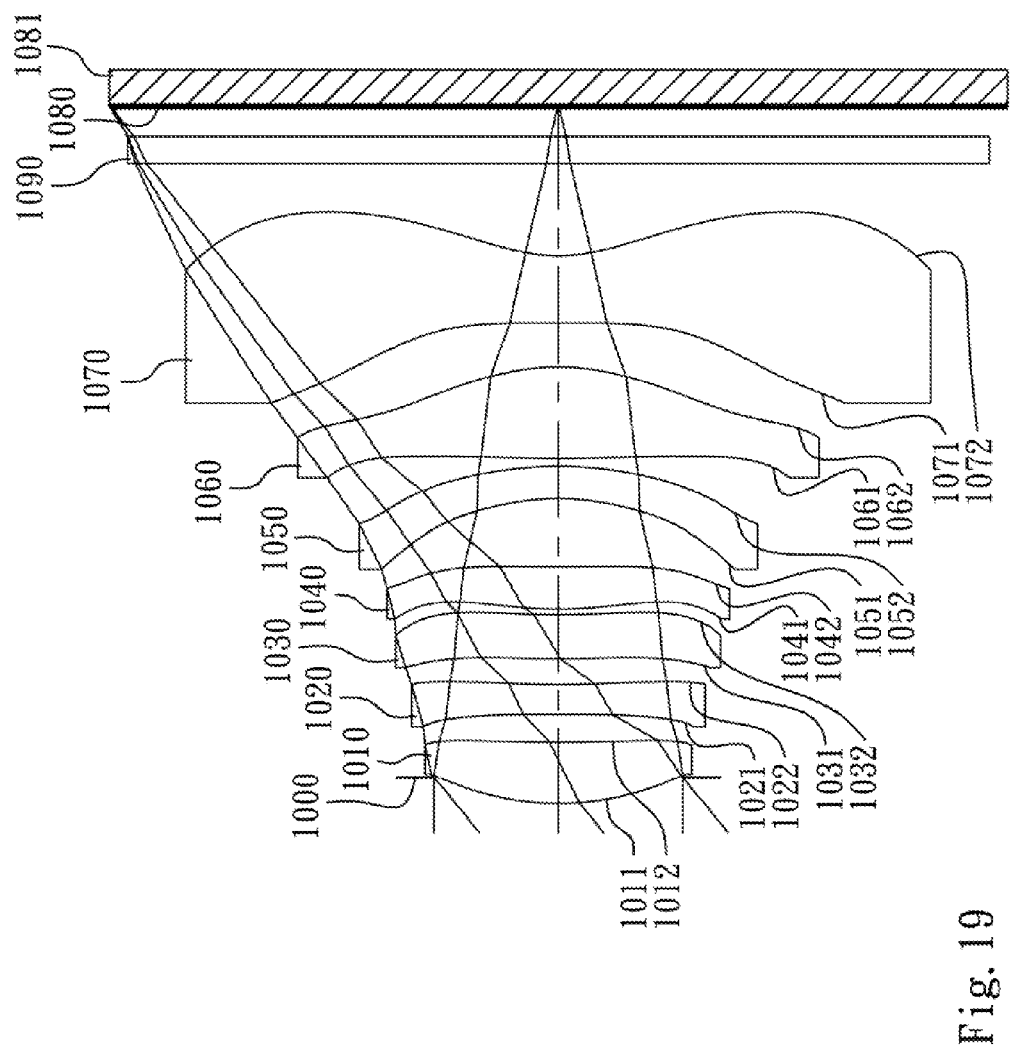
FIG. 19 is a schematic view of an optical image capturing system according to the 10th embodiment of the present disclosure.
Figure 20:
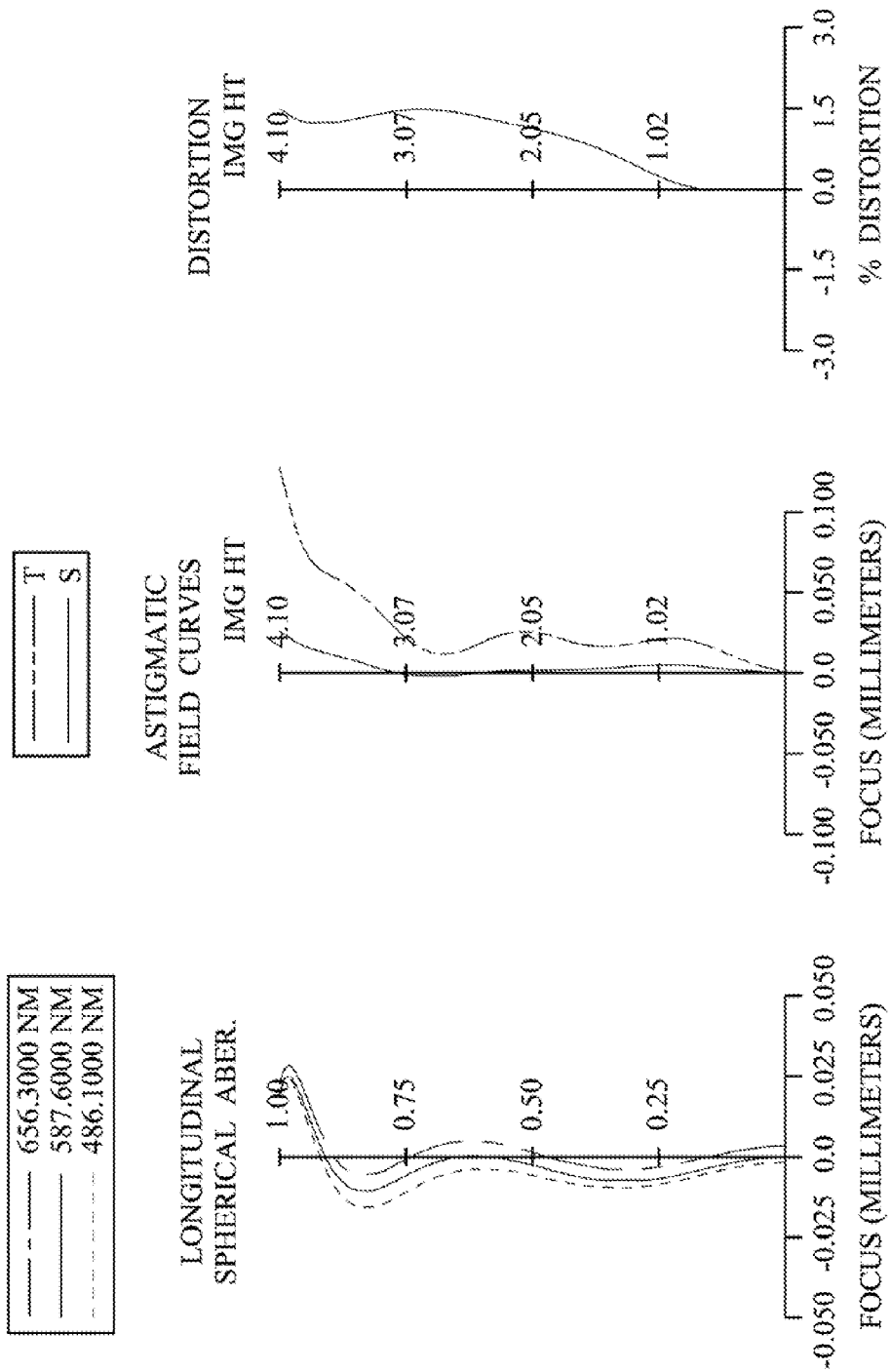
FIG. 20 shows, in order from left to right, spherical aberration curves, astigmatic field curves and a distortion curve of the optical image capturing system according to the 10th embodiment.

FIG. 19 is a schematic view of an optical image capturing system according to the 10th embodiment of the present disclosure. FIG. 20 shows, in order from left to right, spherical aberration curves, astigmatic field curves and a distortion curve of the optical image capturing system according to the 10th embodiment.

In FIG. 19, the optical image capturing system includes, in order from an object side to an image side, an aperture stop 1000, a first lens element 1010, a second lens element 1020, a third lens element 1030, a fourth lens element 1040, a fifth lens element 1050, a sixth lens element 1060, a seventh lens element 1070, an IR-cut filter 1090, an image plane 1080 and an image sensor 1081.

The first lens element 1010 with positive refractive power has a convex object-side surface 1011 and a concave image-side surface 1012, which are both aspheric, and the first lens element 1010 is made of glass material.

The second lens element 1020 with negative refractive power has a concave object-side surface 1021 and a concave image-side surface 1022, which are both aspheric, and the second lens element 1020 is made of plastic material.

The third lens element 1030 with negative refractive power has a convex object-side surface 1031 and a concave image-side surface 1032, which are both aspheric, and the third lens element 1030 is made of plastic material.

The fourth lens element 1040 with positive refractive power has a convex object-side surface 1041 and a concave image-side surface 1042, which are both aspheric, and the fourth lens element 1040 is made of plastic material. Furthermore, the fourth lens element 1040 includes at least one inflection point.

The fifth lens element 1050 with negative refractive power has a concave object-side surface 1051 and a convex image-side surface 1052, which are both aspheric, and the fifth lens element 1050 is made of plastic material.

The sixth lens element 1060 with positive refractive power has a convex object-side surface 1061 and a convex image-side surface 1062 which are both aspheric, and the sixth lens element 1060 is made of plastic material. The object-side surface 1061 changes from convex at a paraxial region to concave at a peripheral region.

The seventh lens element 1070 with negative refractive power has a convex object-side surface 1071 and a concave image-side surface 1072 which are both aspheric, and the image-side surface 1072 changes from concave at a paraxial region to convex at a peripheral region. The seventh lens element 1070 is made of plastic material. Furthermore, the image-side surface 1072 of the seventh lens element 1070 includes at least one inflection point.

The IR-cut filter 1090 is made of glass and located between the seventh lens element 1070 and the image plane 1080, and will not affect the focal length of the optical image capturing system.

The detailed optical data of the 10th embodiment are shown in Table 19 and the aspheric surface data are shown in Table 20 below.

TABLE 19

10th Embodiment
f = 4.88 mm, Fno = 2.15, HFOV = 39.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.238 | | | | |
| 2 | Lens 1 | 2.545850 (ASP) | 0.566 | Glass | 1.566 | 61.1 | 5.15 |
| 3 | | 18.457300 (ASP) | 0.254 | | | | |
| 4 | Lens 2 | −67.453600 (ASP) | 0.270 | Plastic | 1.640 | 23.3 | −9.77 |
| 5 | | 6.896600 (ASP) | 0.238 | | | | |
| 6 | Lens 3 | 14.079200 (ASP) | 0.398 | Plastic | 1.544 | 55.9 | −28.08 |
| 7 | | 7.254400 (ASP) | 0.050 | | | | |
| 8 | Lens 4 | 3.358300 (ASP) | 0.391 | Plastic | 1.544 | 55.9 | 7.12 |
| 9 | | 24.159000 (ASP) | 0.620 | | | | |
| 10 | Lens 5 | −2.101660 (ASP) | 0.300 | Plastic | 1.640 | 23.3 | −11.56 |
| 11 | | −3.099900 (ASP) | 0.070 | | | | |
| 12 | Lens 6 | 10.558400 (ASP) | 0.838 | Plastic | 1.544 | 55.9 | 3.12 |
| 13 | | −1.967170 (ASP) | 0.402 | | | | |
| 14 | Lens 7 | 100.000000 (ASP) | 0.613 | Plastic | 1.530 | 55.8 | −2.72 |
| 15 | | 1.418470 (ASP) | 0.840 | | | | |
| 16 | IR-cut filter | Plano | 0.250 | Glass | 1.517 | 64.2 | — |
| 17 | | Plano | 0.278 | | | | |
| 18 | Image | Plano | — | | | | |

Note:
Reference wavelength (d-line) is 587.6 nm.

TABLE 20

Aspheric Coefficients

| | \multicolumn{5}{c}{Surface #} |
|---|---|---|---|---|---|
| | 2 | 3 | 4 | 5 | 6 |
| k = | 2.61987E−01 | 3.00000E+00 | 0.00000E+00 | −9.20422E+01 | −2.83188E+00 |
| A4 = | −3.63978E−03 | −2.79071E−02 | −7.95060E−02 | −5.54800E−02 | −2.96051E−02 |
| A6 = | −3.09516E−03 | 3.95639E−02 | 9.01905E−02 | 5.13235E−02 | −1.77213E−02 |
| A8 = | 1.03902E−02 | −3.70198E−02 | −5.81773E−02 | −2.76094E−02 | 7.58927E−03 |
| A10 = | −1.97431E−02 | −8.45516E−05 | 5.72088E−03 | 7.40557E−03 | −6.43235E−04 |
| A12 = | 1.60070E−02 | 1.62255E−02 | 1.07101E−02 | −2.37428E−03 | |
| A14 = | −5.53229E−03 | −8.08778E−03 | −5.44790E−03 | 5.20350E−04 | |

| | \multicolumn{5}{c}{Surface #} |
|---|---|---|---|---|---|
| | 7 | 8 | 9 | 10 | 11 |
| k = | 6.22360E−01 | −1.95196E+01 | −2.00000E+01 | −1.44416E+00 | −7.00358E+00 |
| A4 = | −5.49905E−02 | −3.10114E−02 | −2.61120E−02 | 1.05443E−01 | 2.78749E−02 |
| A6 = | 1.85625E−03 | −1.91982E−02 | −2.68191E−02 | −1.26072E−01 | −4.36409E−02 |
| A8 = | −6.56285E−03 | 5.12567E−03 | 8.18832E−03 | 6.70012E−02 | 2.00423E−02 |
| A10 = | 1.09821E−03 | −7.72213E−04 | 2.09360E−04 | −2.77086E−02 | −7.25670E−03 |
| A12 = | | −1.17845E−03 | −3.85316E−04 | 8.16094E−03 | 1.75013E−03 |
| A14 = | | 4.68650E−04 | 1.37346E−04 | −1.05290E−03 | −1.58397E−04 |

| | \multicolumn{4}{c}{Surface #} |
|---|---|---|---|---|
| | 12 | 13 | 14 | 15 |
| k = | 2.44764E+00 | −7.56032E+00 | −1.00000E+00 | −5.83393E+00 |
| A4 = | −4.43411E−02 | −2.49270E−02 | −7.10947E−02 | −2.94847E−02 |
| A6 = | 2.32256E−02 | 1.35465E−03 | 1.19834E−02 | 5.04950E−03 |
| A8 = | −6.70400E−03 | 6.97483E−03 | −2.89486E−04 | −5.66326E−04 |
| A10 = | 6.22040E−04 | −2.49613E−03 | −4.57341E−05 | 3.60309E−05 |
| A12 = | 3.43416E−05 | 3.37937E−04 | −2.10360E−06 | −1.42065E−06 |
| A14 = | −8.28303E−06 | −1.71240E−05 | 3.65101E−07 | 2.88039E−08 |

In the 10th embodiment, the equation of the aspheric surface profiles of the aforementioned lens elements is the same as the equation of the 1st embodiment. Also, the definitions of f, Fno, HFOV, V1, V2, CTmin, R13, R14, f3, f4, f6, f7, SAG52, CT5, Yc72, Td, FOV, TTL and ImgH are the same as those stated in the 1st embodiment with corresponding values for the 9th embodiment, so an explanation in this regard will not be provided again.

Moreover, these parameters can be calculated from Table 19 and Table 20 as the following values and satisfy the following relationships:

| \multicolumn{4}{c}{10th Embodiment} |
|---|---|---|---|
| f (mm) | 4.88 | |f/f6| + |f/f7| | 3.36 |
| Fno | 2.15 | f/f7 | −1.79 |
| HFOV (deg.) | 39.6 | SAG52 + CT5 (mm) | −0.23 |
| V1 − V2 | 37.8 | Yc72/f | 0.43 |
| CTmin (mm) | 0.270 | Td/f | 1.03 |
| R14/R13 | 0.01 | FOV (deg.) | 79.2 |
| R14/f | 0.29 | TTL/ImgH | 1.54 |
| |f/f3| + |f/f4| | 0.86 | | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical image capturing system comprising, in order from an object side to an image side thereof, a first lens element, a second lens element, a third lens element, a fourth lens element, a fifth lens element, a sixth lens element, and a seventh lens element, wherein each of the first lens element, the second lens element, the third lens element, the fourth lens element, the fifth lens element, the sixth lens element and the seventh lens element has an object-side surface facing toward the object side, and an image-side surface facing toward the image side, wherein:

the first lens element having positive refractive power;

the second lens element having negative refractive power, the fifth lens element having the object-side surface and the image-side surface being both aspheric;

the sixth lens element with positive refractive power having at least one convex shape at a peripheral region of the image-side surface thereof, wherein the object-side surface and the image-side surface of the sixth lens element are both aspheric; and the seventh lens element with negative refractive power having at least one convex shape at a peripheral region of the image-side surface thereof, wherein the object-side surface and the image-side surface of the seventh lens element are both aspheric, and at least one of the object-side surface and the image-side surface of the seventh lens element has at least one inflection point thereon;

wherein the optical image capturing system has a total of seven lens elements, a maximal field of view of the optical image capturing system is FOV, an Abbe number of the first lens element is V1, an Abbe number of the second lens element is V2, and the following relationships are satisfied:

72 degrees<FOV<95 degrees; and

28<$V1-V2$≤37.8.

2. The optical image capturing system of claim 1, wherein the first lens element has the object-side surface being convex at a paraxial region thereof, and the second lens element has the image-side surface being concave at a paraxial region thereof.

3. The optical image capturing system of claim 1, wherein the sixth lens element has the image-side surface being convex at a paraxial region thereof, and the seventh lens element has the image-side surface being concave at a paraxial region thereof.

4. The optical image capturing system of claim 1, wherein a curvature radius of the object-side surface of the seventh lens element is R13, a curvature radius of the image-side surface of the seventh lens element is R14, and the following relationship is satisfied:

−5.0<$R14/R13$<1.0.

5. The optical image capturing system of claim 1, wherein a focal length of the optical image capturing system is f, a focal length of the sixth lens element is f6, a focal length of the seventh lens element is f7, and the following relationship is satisfied:

1.8<$|f/f6|+|f/f7|$<6.0.

6. The optical image capturing system of claim 1, wherein a maximum image height of the optical image capturing system is ImgH, an axial distance between the object-side surface of the first lens element and an image plane is TTL, an axial distance from the object-side surface of the first lens element to the image-side surface of the seventh lens element is Td, a focal length of the optical image capturing system is f, and the following relationships are satisfied:

1.00<$TTL/ImgH$<1.70; and 0.50<$Td/f$<1.35.

7. An optical image capturing system comprising, in order from an object side to an image side thereof, a first lens element, a second lens element, a third lens element, a fourth lens element, a fifth lens element, a sixth lens element, and a seventh lens element, wherein each of the first lens element, the second lens element, the third lens element, the fourth lens element, the fifth lens element, the sixth lens element and the seventh lens element has an object-side surface facing toward the object side, and an image-side surface facing toward the image side, wherein:
the first lens element having positive refractive power;
the fourth lens element having at least one of the object-side surface and the image-side surface having at least one inflection point thereon;
the sixth lens element having at least one convex shape at a peripheral region of the image-side surface thereof, wherein the object-side surface and the image-side surface of the sixth lens element are both aspheric; and
the seventh lens element with negative refractive power having at least one convex shape at a peripheral region of the image-side surface thereof, wherein the object-side surface and the image-side surface of the seventh lens element are both aspheric, and at least one of the object-side surface and the image-side surface of the seventh lens element has at least one inflection point thereon;
wherein the optical image capturing system has a total of seven lens elements, the optical image capturing system further comprises an aperture stop positioned on the object side of the third lens element, a maximal field of view of the optical image capturing system is FOV, an axial distance from the object-side surface of the first lens element to the image-side surface of the seventh lens element is Td, a focal length of the optical image capturing system is f, and the following relationships are satisfied:

72 degrees<FOV<95 degrees; and 0.50<$Td/f$<1.35.

8. The optical image capturing system of claim 7, wherein the first lens element has the image-side surface being concave at a paraxial region thereof, and the second lens element has the object-side surface being convex at a paraxial region thereof.

9. The optical image capturing system of claim 7, wherein the fifth lens element has the object-side surface being concave at a paraxial region thereof and the image-side surface being convex at a paraxial region thereof.

10. The optical image capturing system of claim 7, wherein the seventh lens element has the object-side surface being concave at a paraxial region thereof.

11. The optical image capturing system of claim 7, wherein the object-side surface of the sixth lens element changes from convex at a paraxial region thereof to concave at a peripheral region thereof.

12. The optical image capturing system of claim 7, wherein the second lens element, the third lens element, the fourth lens element, the fifth lens element, the sixth lens element and the seventh lens element are made of plastic materials; each of the first lens element, the second lens element, the third lens element, the fourth lens element, the fifth lens element, the sixth lens element and the seventh lens element is a single and non-cemented lens element, an Abbe number of the first lens element is V1, an Abbe number of the second lens element is V2, and the following relationship is satisfied:

28<$V1-V2$<42.

13. The optical image capturing system of claim 7, wherein the focal length of the optical image capturing system is f, a focal length of the seventh lens element is f7, and the following relationship is satisfied:

−3.0<$f/f7$<−1.3.

14. The optical image capturing system of claim 7, wherein the focal length of the optical image capturing system is f, a focal length of the third lens element is f3, a focal length of the fourth lens element is f4, and the following relationship is satisfied:

$|f/f3|+|f/f4|$<1.0.

15. The optical image capturing system of claim 7, wherein the focal length of the optical image capturing system is f, a vertical distance from a critical point on the image-side surface of the seventh lens element to an axial vertex on the image-side surface of the seventh lens element is Yc72, and the following relationship is satisfied:

0.1<$Yc72/f$<0.9.

16. The optical image capturing system of claim 7, wherein an axial distance between the second lens element and the third lens element is smaller than an axial distance between the fourth lens element and the fifth lens element.

17. The optical image capturing system of claim 7, wherein an axial distance between the sixth lens element and the seventh lens element is smaller than an axial distance between the second lens element and the third lens element.

18. An optical image capturing system comprising, in order from an object side to an image side thereof, a first lens element, a second lens element, a third lens element, a fourth lens element, a fifth lens element, a sixth lens element, and a seventh lens element, wherein each of the first lens element, the second lens element, the third lens element, the fourth lens element, the fifth lens element, the sixth lens element and the seventh lens element has an object-side surface facing toward the object side, and an image-side surface facing toward the image side, wherein:

the first lens element having at least one convex shape at a peripheral region of the object-side surface thereof;

the fourth lens element having at least one of the object-side surface and the image-side surface having at least one inflection point thereon;

the sixth lens element having at least one convex shape at a peripheral region of the image-side surface thereof, wherein the object-side surface and the image-side surface of the sixth lens element are both aspheric; and the seventh lens element having the image-side surface being concave at a paraxial region thereof, wherein the image-side surface of the seventh lens element changes from concave at a paraxial region thereof to convex at a peripheral region thereof, and the object-side surface and the image-side surface of the seventh lens element are both aspheric;

wherein the optical image capturing system has a total of seven lens elements, a maximal field of view of the optical image capturing system is FOV, a maximum image height of the optical image capturing system is ImgH, an axial distance between the object-side surface of the first lens element and an image plane is TTL, a curvature radius of the object-side surface of the seventh lens element is R13, a curvature radius of the image-side surface of the seventh lens element is R14, a vertical distance from a critical point on the image-side surface of the seventh lens element to an axial vertex on the image-side surface of the seventh lens element is Yc72, a focal length of the optical image capturing system is f, and the following relationships are satisfied:

72 degrees<FOV<95 degrees;

1.00<$TTL$/ImgH<1.70;

−5.0<$R14/R13$<1.0; and 0.1<$Yc72/f$<0.9.

19. The optical image capturing system of claim 18, wherein the sixth lens element has positive refractive power, and the seventh lens element has negative refractive power.

20. The optical image capturing system of claim 18, wherein the fifth lens element has negative refractive power.

21. The optical image capturing system of claim 18, wherein the fifth lens element has the object-side surface being concave at a paraxial region thereof.

22. The optical image capturing system of claim 18, wherein the focal length of the optical image capturing system is f, a focal length of the third lens element is f3, a focal length of the fourth lens element is f4, and the following relationship is satisfied:

$|f/f3|+|f/f4|<1.0$.

23. The optical image capturing system of claim 18, wherein the focal length of the optical image capturing system is f, a focal length of the sixth lens element is f6, a focal length of the seventh lens element is f7, and the following relationship is satisfied:

$1.8<|f/f6|+|f/f7|<6.0$.

24. The optical image capturing system of claim 18, wherein the curvature radius of the object-side surface of the seventh lens element is R13, the curvature radius of the image-side surface of the seventh lens element is R14, and the following relationship is satisfied:

$-2.0<R14/R13<0.5$.

25. The optical image capturing system of claim 18, wherein each of the first lens element, the second lens element, the third lens element, the fourth lens element, the fifth lens element, the sixth lens element and the seventh lens element is a single and non-cemented lens element, an axial distance from the object-side surface of the first lens element to the image-side surface of the seventh lens element is Td, the focal length of the optical image capturing system is f, and the following relationship is satisfied:

$0.50<Td/f<1.35$.

26. The optical image capturing system of claim 18, wherein an Abbe number of the first lens element is V1, an Abbe number of the second lens element is V2, and the following relationship is satisfied:

$28<V1-V2<42$.

27. The optical image capturing system of claim 18, wherein the second lens element, the third lens element, the fourth lens element, the fifth lens element, the sixth lens element and the seventh lens element are made of plastic materials, a minimum central thickness of a lens element among the seven lens elements of the optical image capturing system is CTmin, and the following relationship is satisfied:

0.10 mm<$CT$min<0.30 mm.

28. The optical image capturing system of claim 18, wherein the object-side surface of the sixth lens element changes from convex at a paraxial region thereof to concave at a peripheral region thereof.

29. The optical image capturing system of claim 18, further comprising:

an aperture stop positioned on the object side of the second lens element.

30. The optical image capturing system of claim 18, wherein an absolute value of a focal length of the first lens element is smaller than an absolute value of a focal length of the third lens element.

31. The optical image capturing system of claim 18, wherein an absolute value of a curvature radius of the object-side surface of the first lens element is smaller than an absolute value of a curvature radius of the image-side surface of the first lens element.

32. The optical image capturing system of claim 18, wherein an absolute value of a curvature radius of the object-side surface of the second lens element is larger than an absolute value of a curvature radius of the image-side surface of the second lens element.

* * * * *